United States Patent
Li et al.

(10) Patent No.: US 12,470,929 B2
(45) Date of Patent: Nov. 11, 2025

(54) COMMUNICATION METHOD, APPARATUS, AND DEVICE

(71) Applicant: SHENZHEN YINWANG INTELLIGENT TECHNOLOGIES CO., LTD., Shenzhen (CN)

(72) Inventors: Mingchao Li, Beijing (CN); Miao Yang, Beijing (CN)

(73) Assignee: Shenzhen Yinwang Intelligent Technologies Co., Ltd.

( * ) Notice: Subject to any disclaimer, the term of this patent is extended or adjusted under 35 U.S.C. 154(b) by 242 days.

(21) Appl. No.: 18/468,407

(22) Filed: Sep. 15, 2023

(65) Prior Publication Data

US 2024/0007856 A1 Jan. 4, 2024

Related U.S. Application Data

(63) Continuation of application No. PCT/CN2022/079977, filed on Mar. 9, 2022.

(30) Foreign Application Priority Data

Mar. 18, 2021 (CN) .......................... 202110293153.X

(51) Int. Cl.
H04W 12/08 (2021.01)
H04L 9/40 (2022.01)

(52) U.S. Cl.
CPC ........... *H04W 12/08* (2013.01); *H04L 63/205* (2013.01)

(58) Field of Classification Search
CPC ............................... H04W 12/08; H04L 63/205
See application file for complete search history.

(56) References Cited

U.S. PATENT DOCUMENTS

| | | | |
|---|---|---|---|
| 11,290,884 B2 * | 3/2022 | Kim | H04W 48/02 |
| 2009/0327695 A1 | 12/2009 | Molsberry et al. | |
| 2016/0364163 A1 | 12/2016 | Kamble | |
| 2018/0279095 A1 | 9/2018 | Xu et al. | |
| 2019/0349936 A1 | 11/2019 | Li et al. | |
| 2021/0067960 A1 | 3/2021 | Lee et al. | |

FOREIGN PATENT DOCUMENTS

| | | |
|---|---|---|
| CN | 101488847 A | 7/2009 |
| CN | 105704641 A | 6/2016 |
| CN | 106341813 A | 1/2017 |

(Continued)

OTHER PUBLICATIONS

Extended European Search Report in European Appln. No. 22770364.2, mailed on Jul. 22, 2024, 9 pages.

(Continued)

*Primary Examiner* — Bryan Y Lee
(74) *Attorney, Agent, or Firm* — Fish & Richardson P.C.

(57) ABSTRACT

This application provides example communication methods, apparatuses, and devices, which may be applied to the internet of vehicles. In an example communication method, a first device obtains service data, and performs security processing on the service data. The first device sends service data and indication information to a second device. The indication information indicates a security mechanism used to perform the security processing on the service data or indicates a protocol layer used to perform the security processing on the service data.

32 Claims, 9 Drawing Sheets

(56) References Cited

FOREIGN PATENT DOCUMENTS

| | | | |
|---|---|---|---|
| CN | 108476217 A | 8/2018 | |
| CN | 111726414 A | 9/2020 | |
| EP | 3349514 A1 | 7/2018 | |
| EP | 3606124 A1 | 2/2020 | |
| EP | 3614713 A1 | 2/2020 | |
| EP | 3319354 B1 | 12/2020 | |
| WO | 2017210811 A1 | 12/2017 | |

OTHER PUBLICATIONS

National Standards of the People's Republic of China, "Information technology radio frequency identification 800/900 MHz radio interface protocol; Information Technology Radio Frequency Identification 800/900 MHz 800/900 MHz air interface protocol," GB/T 29768-2013, Sep. 18, 2013, 187 pages (with English translation).

National Standards of the People's Republic of China, "Dedicated short-range communication for electronic toll collection Part 4: Device Apps; Electronic toll collection—Dedicated short range communication—Part 4: Equipment application," GB/T 20851.4-2019, May 10, 2019, 121 pages (with English translation).

International Search Report and Written Opinion in International Appln. No. PCT/CN2022/079977, mailed on May 6, 2022, 15 pages (with English translation).

\* cited by examiner

COMMUNICATION METHOD, APPARATUS, AND DEVICE

CROSS-REFERENCE TO RELATED APPLICATIONS

This application is a continuation of International Application No. PCT/CN2022/079977, filed on Mar. 9, 2022, which claims priority to Chinese Patent Application No. 202110293153.X, filed on Mar. 18, 2021. The disclosures of the aforementioned applications are hereby incorporated by reference in their entireties.

TECHNICAL FIELD

This application relates to the internet of vehicles field, and in particular, to a communication method, apparatus, and device.

BACKGROUND

With continuous development of society, automobiles are increasingly popular. A vehicle may obtain road condition information in time in a manner, for example, vehicle-to-vehicle (V2V) communication, vehicle-to-infrastructure (V2I) communication, vehicle-to-pedestrian (V2P) communication, or vehicle-to-network (V2N) communication, to improve driving safety, reduce congestion, and improve traffic efficiency. These communication manners may be collectively referred to as "V2X (vehicle-to-everything)" communication (X represents anything). A network used for V2X communication is referred to as the internet of vehicles. Internet of vehicles communication based on a cellular network is currently an important communication means, for example, V2X based on a long term evolution (LTE) communication technology (LTE-V2X) communication or V2X based on a 5th generation (5G) communication technology (5G-V2X) communication.

Currently, due to continuous development of a V2X service, V2X communication is no longer limited to service data that supports a broadcast service. For example, the vehicle broadcasts basic information of the vehicle such as a location, a speed, and a head direction to another vehicle or device, and also seeks service data that supports a unicast service, for example, service data of a unicast service including sensor data exchange between vehicles or between a vehicle and a road side unit, or communication between a vehicle and a road side unit to perform, for example, near-field charging or identity information query and management. However, a current V2X security mechanism is specific to the broadcast service, and therefore is known to different receiving ends. Consequently, if the current security mechanism is still used to perform security processing on the service data of the unicast service, there may be an information leakage risk, and security is poor.

SUMMARY

This application provides a communication method, apparatus, and device, to improve security of V2X end-to-end communication.

According to a first aspect, this application provides a communication method. The communication method may be applied to a first device in the internet of vehicles. The first device is, for example, an on board unit (OBU) or a road side unit (RSU). The method includes: The first device obtains service data, and performs security processing on the service data. The first device sends service data and first indication information to a second device. The first indication information indicates a security mechanism used to perform the security processing on the service data or a protocol layer used to perform the security processing on the service data.

In this application, the first device may perform the security processing on the service data by using different security mechanisms. For example, the first device may perform the security processing on the service data by using a first security mechanism, or may perform the security processing on the service data by using a second security mechanism, or may perform the security processing on the service data by using both a first security mechanism and a second security mechanism.

In some possible implementations, the first security mechanism may be understood as a general security mechanism, and is applicable to V2X services of different service types, for example, a broadcast service and a unicast service. The second security mechanism may be understood as a dedicated security mechanism, and is applicable to a V2X service of a preset service type, for example, a unicast service or a specific service in a unicast service, for example, near-field payment, electronic toll collection, vehicle identity management, or motor vehicle electronic identifier management.

In some possible implementations, the first security mode may be understood as a V2X-based security mechanism (for example, an LTE-V2X security mechanism), for example, a security mechanism provided at a security layer in an LTE-V2X protocol stack. The second security mode may be understood as a security mechanism that is set for a service type, for example, a security mechanism provided at an application layer or a message layer in the LTE-V2X protocol stack for a unicast service or a specific service in a unicast service.

In some possible implementations, the first security mechanism may be understood as a security mechanism used to perform the security processing at a security layer. The second security mechanism may be understood as a security mechanism used to perform the security processing at an application layer or a message layer.

In this application, the first device may further perform the security processing on the service data at different protocol layers. For example, the first device may perform the security processing on the service data at a security layer (for example, a security layer in a V2X protocol stack); or the first device may perform the security processing on the service data at an application layer (for example, an application layer in a V2X protocol stack) or a message layer (for example, a message layer in a V2X protocol stack); or the first device may perform the security processing on the service data at an application layer and a security layer; or the first device may perform the security processing on the service data at a message layer and a security layer.

In this application, the first device indicates, to the second device, the security mechanism or the protocol layer used to perform the security processing on the service data, so that the second device can perform, based on the indication of the first indication information, the security processing on the service data by using the corresponding security mechanism. This reduces an information leakage risk, thereby improving security of V2X end-to-end communication. Further, the first device indicates, to the second device, the security mechanism or the protocol layer used to perform the security processing on the service data, so that the second device can perform, based on the indication of the first indication information, the security processing on the service data by using the corresponding security mechanism. This reduces a case in which the first device and the second device cannot communicate because different security mechanisms are used, thereby improving reliability of V2X end-to-end communication.

In some possible implementations, the method may further include: The first device sends identification information to the second device. The identification information identifies a service type of the service data.

It may be understood that, in addition to sending the service data and the first indication information to the second device, the first device may further send the identification information to the second device, to indicate the service type of the service data to the second device. In this case, if the first indication information indicates to perform the security processing on the service data at the application layer, the second device may perform, based on the service type indicated by the identification information, the security processing on the service data in a security processing manner corresponding to the service type.

Optionally, the service type may be near-field payment, electronic toll collection, vehicle identity management, motor vehicle electronic identifier management, or the like.

In some possible implementations, the method may further include: The first device sends second indication information to the second device. The second indication information indicates content of the security processing. Herein, the content of the security processing may be understood as a specific processing manner corresponding to a security mechanism.

In this application, the first indication information and the second indication information may exist in different messages. Alternatively, the first indication information and the second indication information are located in two different information fields in a same message.

Specifically, if the first indication information and the second indication information may be located in two different information fields in a same message, the first indication information and the second indication information may be carried by using a character string of N bits. First K bits may indicate the security mechanism used to perform the security processing on the service data. Last (N–K) bits may indicate the content of the security processing performed on the service data. N is a positive integer, and K is a positive integer less than N.

In some possible implementations, when the security mechanism used for the security processing is the first security mechanism, content of the security processing may include no encryption and no signature, signature only and no encryption, or signature and encryption.

In some possible implementations, when the second security mechanism is used for the security processing, content of the security processing may include a first part and a second part associated with the first part. The first part includes supporting security authentication, supporting no security authentication, supporting security authentication but requiring no encrypted communication, or supporting security authentication and requiring encrypted communication. The second part includes asymmetric encryption, symmetric encryption, exclusive OR bidirectional authentication, exclusive OR unidirectional authentication, or symmetric encryption and unidirectional authentication.

Herein, the first part may be understood as a security mode, and the second part may be understood as a security function. The security mode is associated with the security function. The security mode indicates a security processing capability for a V2X service, and the security function indicates a security function used in a specific security mode. The security mode and the security function can cooperatively indicate specific security processing performed on the service data, so that the second device can perform corresponding security processing on the service data, to implement V2X end-to-end secure communication.

In some possible implementations, that the first device sends the service data and indication information to the second device may specifically include: The first device sends a data frame to the second device. The data frame includes a frame header and a payload. The indication information is carried in the frame header, and the service data is carried in the payload. The indication information may be only the first indication information, or may be the first indication information and the second indication information.

In some possible implementations, the frame header includes an extension field and extension field indication information. When the indication information is carried in the extension field, the extension field indication information indicates that the data frame carries the indication information.

In some possible implementations, the frame header further includes association indication information. The association indication information indicates whether the indication information is associated with the service data in the payload.

When the association indication information is set to a true value, the association indication information indicates that the indication information is associated with the service data in the payload. When the association indication information is set to a non-true value, the association indication information indicates that the indication information is not associated with the service data in the payload.

In some possible implementations, before the first device sends the data frame to the second device, the method further includes: The first device transfers the service data and the indication information to a network layer at the message layer. The first device encapsulates the service data and the indication information into the data frame at the network layer.

According to a second aspect, this application further provides a communication method. The communication method may be applied to a second device in the internet of vehicles. The second device is, for example, an OBU or an RSU. The method may include: The second device receives service data and first indication information from a first device. The second device performs security processing on the service data based on the first indication information. The first indication information indicates a security mechanism used to perform the security processing on the service data.

In some possible implementations, the method further includes: The second device receives identification information from the first device. The identification information identifies a service type of the service data.

It may be understood that, in addition to sending the service data and the first indication information to the second device, the first device may further send the identification information to the second device, to indicate, to the second device, the service type of the service data and a protocol layer used to perform the security processing on the service data. In this case, if the first indication information indicates to perform the security processing on the service data at an application layer, the second device may perform, based on the service type indicated by the identification information, the security processing on the service data in a security processing manner corresponding to the service type.

Optionally, the service type may be near-field payment, electronic toll collection, vehicle identity management, motor vehicle electronic identifier management, or the like.

In some possible implementations, in addition to the first indication information, indication information received by the second device from the first device further includes second indication information. The second indication information indicates content of the security processing. Herein, the content of the security processing may be understood as a specific processing manner corresponding to a security mechanism.

In this application, the first indication information and the second indication information may exist in different messages. Alternatively, the first indication information and the second indication information are located in two different information fields in a same message.

Specifically, if the first indication information and the second indication information may be located in two different information fields in a same message, the indication information including the first indication information and the second indication information may be carried by using a character string of N bits. First K bits indicate the security mechanism used for the security processing. Last (N−K) bits of the character string indicate the content of the security processing. N is a positive integer, and K is a positive integer less than N.

In some possible implementations, when the security mechanism used for the security processing is a first security mechanism, content of the security processing may include no encryption and no signature, signature only and no encryption, or signature and encryption.

In some possible implementations, when the security mechanism used for the security processing is a second security mechanism, content of the security processing may include a first part and a second part associated with the first part. The first part includes supporting security authentication, supporting no security authentication, supporting security authentication but requiring no secure communication, or supporting security authentication and requiring secure communication. The second part includes asymmetric encryption, symmetric encryption, exclusive OR bidirectional authentication, exclusive OR unidirectional authentication, or symmetric encryption and unidirectional authentication.

Herein, the first part may be understood as a security mode, and the second part may be understood as a security function. The security mode is associated with the security function. The security mode indicates a security processing capability for a V2X service, and the security function indicates a security function used in a specific security mode. The security mode and the security function can cooperatively indicate specific security processing performed on the service data, so that the second device can perform corresponding security processing on the service data, to implement V2X end-to-end secure communication.

In some possible implementations, that the second device receives the service data and the indication information from the first device may specifically include: The second device receives a data frame from the first device. The data frame includes a frame header and a payload. The indication information is carried in the frame header, and the service data is carried in the payload. The indication information may be only the first indication information, or may be the first indication information and the second indication information.

In some possible implementations, the frame header includes an extension field and extension field indication information. When the indication information is carried in the extension field, the extension field indication information indicates that the data frame carries the indication information.

In some possible implementations, the frame header further includes association indication information. The association indication information indicates whether the indication information is associated with the service data in the payload.

When the association indication information is set to a true value, the association indication information indicates that the indication information is associated with the service data in the payload. When the association indication information is set to a non-true value, the association indication information indicates that the indication information is not associated with the service data in the payload.

In some possible implementations, after the second device receives the data frame from the first device, the method may further include: The second device obtains the service data and the indication information in the data frame at a network layer. The second device transfers the service data and the indication information to a message layer at the network layer. The second device performs the security processing on the service data at the message layer based on an indication of the indication information.

In some possible implementations, that the second device performs the security processing on the service data at the message layer based on the indication of the first indication information may include: If the first indication information indicates that a first security mechanism is used for the security processing, the second device transfers the service data to a security layer at the message layer, and performs the security processing on the service data at the security layer by using the first security mechanism. Alternatively, if the first indication information indicates that a second security mechanism is used for the security processing, the second device transfers the service data to an application layer at the message layer, and performs the security processing on the service data at the application layer by using the second security mechanism. Optionally, if the first indication information indicates that the second security mechanism is used for the security processing, the second device performs the security processing on the service data at the message layer by using the second security mechanism.

In some other possible implementations, that the second device performs the security processing on the service data at the message layer based on the indication of the first indication information may alternatively include: If the first indication information indicates that a first security mechanism and a second security mechanism are used for the security processing, the second device transfers the service data to a security layer at the message layer. The second device performs the security processing on the service data at the security layer by using the first security mechanism. The second device transfers processed service data to the message layer at the security layer. The second device performs the security processing on the processed service data at the message layer based on the second security mechanism. Optionally, the second device may transfer the processed service data to an application layer at the message layer, and perform the security processing on the processed service data at the application layer by using the second security mechanism. Alternatively, the second device may perform the security processing on the processed service data at the message layer by using the second security mechanism.

In some possible implementations, that the second device performs the security processing on the service data at the message layer based on the indication of the first indication information may include: If the first indication information indicates to perform the security processing on the service data at a security layer, the second device transfers the service data to the security layer at the message layer, and performs the security processing on the service data at the security layer. Alternatively, if the first indication information indicates to perform the security processing on the service data at an application layer, the second device transfers the service data to the application layer at the message layer, and performs the security processing on the service data at the application layer. Alternatively, if the first indication information indicates to perform the security processing on the service data at the message layer, the second device performs the security processing on the service data at the message layer.

In some other possible implementations, that the second device performs the security processing on the service data at the message layer based on the indication of the first indication information may alternatively include: If the first indication information indicates to perform the security processing on the service data at a security layer and an application layer, the second device transfers the service data to the security layer at the message layer. The second device performs the security processing on the service data at the security layer. The second device transfers processed service data to the message layer at the security layer. The second device transfers the processed service data to the application layer at the message layer, and performs the security processing on the processed service data at the application layer.

Optionally, that the second device performs the security processing on the service data at the message layer based on the indication of the first indication information may alternatively include: If the first indication information indicates to perform the security processing on the service data at a security layer and the message layer, the second device transfers the service data to the security layer at the message layer. The second device performs the security processing on the service data at the security layer. The second device transfers processed service data to the message layer at the security layer. The second device performs the security processing on the processed service data at the message layer.

According to a third aspect, this application provides a communication apparatus. The communication apparatus may be a first device in the internet of vehicles or a chip or a system-on-a-chip in a first device, or may be a function module that is configured to implement the method according to any one of the first aspect and the possible implementations of the first aspect and that is in a first device. The communication apparatus may implement a function performed by the first device in the foregoing aspects or the possible implementations. The function may be implemented by hardware executing corresponding software. The hardware or the software includes one or more modules corresponding to the foregoing function. The communication apparatus includes: a processing module, configured to: obtain service data, and perform security processing on the service data; and a sending module, configured to send service data and indication information to a second device. The indication information indicates a security mechanism used to perform the security processing on the service data or indicates a protocol layer used to perform the security processing on the service data.

In some possible implementations, the sending module is further configured to send identification information to the second device. The identification information identifies a service type of the service data.

In some possible implementations, the indication information further indicates content of the security processing.

In some possible implementations, the indication information is a character string of N bits. First K bits of the character string indicate the security mechanism used for the security processing. Last (N–K) bits of the character string indicate the content of the security processing. N is a positive integer, and K is a positive integer less than N.

In some possible implementations, the indication information indicates a first security mechanism used for the security processing, or indicates a second security mechanism used for the security processing, or indicates a first security mechanism and a second security mechanism that are used for the security processing. Alternatively, the indication information indicates to perform the security processing on the service data at an application layer, at a security layer, or at an application layer and a security layer.

In some possible implementations, the first security mechanism is a V2X-based security mechanism, and the second security mechanism is a security mechanism that is set for a service type.

In some possible implementations, when the security mechanism used for the security processing is the first security mechanism, content of the security processing includes no encryption and no signature, signature only and no encryption, or signature and encryption.

In some possible implementations, when the security mechanism used for the security processing is the second security mechanism, content of the security processing includes a first part and a second part associated with the first part. The first part includes supporting security authentication, supporting no security authentication, supporting security authentication but requiring no encrypted communication, or supporting security authentication and requiring encrypted communication. The second part includes asymmetric encryption, symmetric encryption, exclusive OR bidirectional authentication, exclusive OR unidirectional authentication, or symmetric encryption and unidirectional authentication.

In some possible implementations, that the first device sends the service data and the indication information to the second device includes: The first device sends a data frame to the second device. The data frame includes a frame header and a payload. The indication information is carried in the frame header, and the service data is carried in the payload.

In some possible implementations, the frame header includes an extension field and extension field indication information. When the indication information is carried in the extension field, the extension field indication information indicates that the data frame carries the indication information.

In some possible implementations, the frame header further includes association indication information. The association indication information indicates whether the indication information is associated with the service data in the payload.

In some possible implementations, the processing module is further configured to: before the sending module sends the data frame to the second device, transfer the service data and the indication information to a network layer at a message layer; and encapsulate the service data and the indication information into the data frame at the network layer.

According to a fourth aspect, this application provides a communication apparatus. The communication apparatus may be a second device in the internet of vehicles or a chip or a system-on-a-chip in a second device, or may be a function module that is configured to implement the method according to any one of the second aspect and the possible implementations of the second aspect and that is in a second device. The communication apparatus may implement a function performed by the second device in the foregoing aspects or the possible implementations. The function may be implemented by hardware executing corresponding software. The hardware or the software includes one or more modules corresponding to the foregoing function. The communication apparatus includes: a receiving module, configured to receive a data frame from a first device, where the data frame includes service data and indication information; and a processing module, configured to perform security processing on the service data based on the indication information. The indication information indicates a security mechanism used to perform the security processing on the service data or indicates a protocol layer used to perform the security processing on the service data.

In some possible implementations, the receiving module is further configured to receive identification information from the first device. The identification information identifies a service type of the service data.

In some possible implementations, the indication information further indicates content of the security processing.

In some possible implementations, the indication information is a character string of N bits. First K bits of the character string indicate the security mechanism used for the security processing. Last (N–K) bits of the character string indicate the content of the security processing. N is a positive integer, and K is a positive integer less than N.

In some possible implementations, the indication information indicates a first security mechanism used for the security processing, or indicates a second security mechanism used for the security processing, or indicates a first security mechanism and a second security mechanism that are used for the security processing. Alternatively, the indication information indicates to perform the security processing on the service data at an application layer, at a security layer, or at an application layer and a security layer.

In some possible implementations, the first security mechanism is a V2X-based security mechanism, and the second security mechanism is a security mechanism that is set for a service type.

In some possible implementations, when the security mechanism used for the security processing is the first security mechanism, content of the security processing includes no encryption and no signature, signature only and no encryption, or signature and encryption.

In some possible implementations, when the security mechanism used for the security processing is the second security mechanism, content of the security processing includes a first part and a second part associated with the first part. The first part includes supporting security authentication, supporting no security authentication, supporting security authentication but requiring no secure communication, or supporting security authentication and requiring secure communication. The second part includes asymmetric encryption, symmetric encryption, exclusive OR bidirectional authentication, exclusive OR unidirectional authentication, or symmetric encryption and unidirectional authentication.

In some possible implementations, the receiving module is specifically configured to receive the data frame from the first device. The data frame includes a frame header and a payload. The indication information is carried in the frame header, and the service data is carried in the payload.

In some possible implementations, the frame header includes an extension field and extension field indication information. When the indication information is carried in the extension field, the extension field indication information indicates that the data frame carries the indication information.

In some possible implementations, the frame header further includes association indication information. The association indication information indicates whether the indication information is associated with the service data in the payload. When the association indication information is set to a true value, the association indication information indicates that the indication information is associated with the service data in the payload. When the association indication information is set to a non-true value, the association indication information indicates that the indication information is not associated with the service data in the payload.

In some possible implementations, after the second device receives the data frame sent by the first device, the apparatus further includes: the processing module, configured to: obtain the service data and the indication information in the data frame at a network layer; transfer the service data and the indication information to a message layer at the network layer; and perform the security processing on the service data at the message layer based on the indication of the indication information.

According to a fifth aspect, this application provides a communication device, for example, a first device in the internet of vehicles. The communication device may include a processor and a memory. The processor is coupled to the memory. The processor is configured to read and execute instructions in the memory, to implement the communication method according to any one of the first aspect and the possible implementations of the first aspect.

According to a sixth aspect, this application provides a communication device, for example, a second device in the internet of vehicles. The communication device includes a processor and a memory. The processor is coupled to the memory. The processor is configured to read and execute instructions in the memory, to implement the communication method according to any one of the second aspect and the possible implementations of the second aspect.

According to a seventh aspect, this application provides a computer-readable storage medium. The computer-readable storage medium stores instructions; and the instructions are run on a computer, to perform the communication method according to any one of the first aspect and the second aspect.

According to an eighth aspect, this application provides a computer program or a computer program product. When the computer program product is executed on a computer, the computer is enabled to implement the communication method according to any one of the first aspect and the second aspect.

It should be understood that technical solutions of the third to the eighth aspects of this application are consistent with technical solutions of the first aspect and the second aspect of this application, and beneficial effects achieved by the aspects and the corresponding feasible implementations are similar. Details are not described again.

BRIEF DESCRIPTION OF DRAWINGS

To describe technical solutions in embodiments of this application more clearly, the following describes the accompanying drawings used in embodiments of this application.

DESCRIPTION OF EMBODIMENTS

The following describes embodiments of this application with reference to the accompanying drawings in embodiments of this application. In the following descriptions, reference is made to the accompanying drawings that form a part of this application and show, by way of illustration, specific aspects of embodiments of this application or specific aspects in which embodiments of this application may be used. It should be understood that embodiments of this application may be used in other aspects, and may include structural or logical changes not depicted in the accompanying drawings. Therefore, the following detailed descriptions shall not be understood in a limiting sense, and the scope of this application is defined by the appended claims. For example, it should be understood that the disclosure with reference to the described method may also be applied to a corresponding device or system for performing the method, and vice versa. For example, if one or more specific method steps are described, a corresponding device may include one or more units such as a functional unit for performing the described one or more method steps (for example, one unit performs the one or more steps; or a plurality of units, each of which performs one or more of the plurality of steps), even if such one or more units are not explicitly described or illustrated in the accompanying drawings. In addition, for example, if a specific apparatus is described based on one or more units such as a functional unit, a corresponding method may include one step for implementing functionality of one or more units (for example, one step for implementing functionality of one or more units; or a plurality of steps, each of which is for implementing functionality of one or more units in a plurality of units), even if such one or more of steps are not explicitly described or illustrated in the accompanying drawings. Further, it should be understood that features of various example embodiments and/or aspects described in this specification may be combined with each other, unless otherwise specified.

Figure 1:
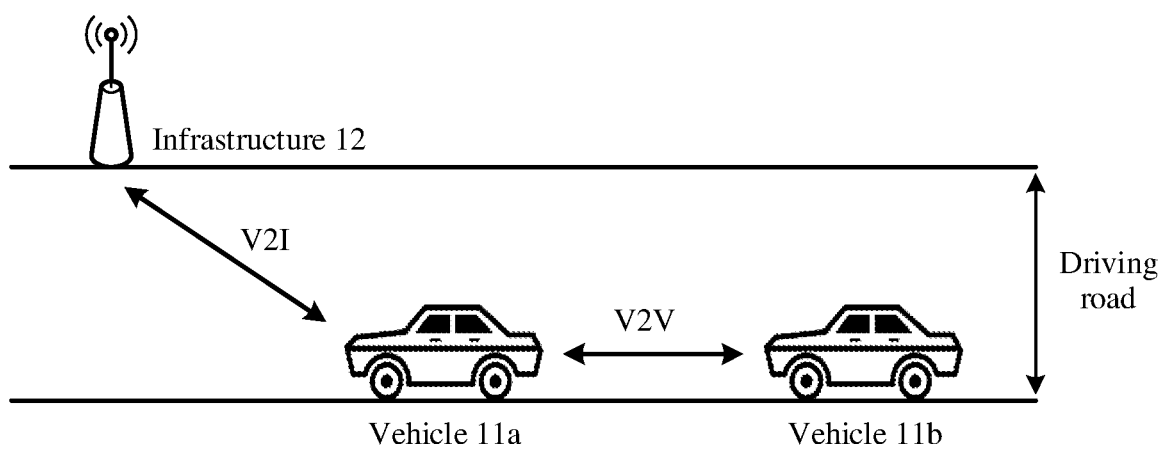
FIG. 1 is a schematic diagram of communication between vehicles and communication between a vehicle and an infrastructure according to an embodiment of this application.

In embodiments of this application, FIG. 1 is a schematic diagram of communication between vehicles and communication between a vehicle and an infrastructure according to an embodiment of this application. Refer to FIG. 1. The vehicle may obtain road condition information in time, or perform cooperative communication with another device, or the like through V2V communication or V2I communication, to improve driving safety, reduce congestion, improve traffic efficiency, and the like. The vehicle may further obtain richer services by communicating with another apparatus, for example, perform instant communication through V2P communication, vehicle-to-device V2D (vehicle-to-device) communication, or V2N communication, to obtain more services. The foregoing communication manners may be collectively referred to as V2X communication. A network used for V2X communication is referred to as the internet of vehicles.

For example, still refer to FIG. 1. V2V communication and V2I communication are used as examples. A vehicle 11a may broadcast information of the vehicle 11a to a surrounding vehicle (for example, a vehicle 11b) through V2V communication. The information includes, for example, at least one of the following information: a vehicle speed, a driving direction, a vehicle location, whether an emergency brake is stepped on, and the like. By obtaining such information, a driver can better perceive a traffic condition outside a sight distance, to predict a danger in advance and then avoid the danger. In V2I communication, in addition to exchange of the foregoing safety information, an infrastructure 12 may further provide various types of service information and data network access for the vehicle 11a. Functions such as electronic toll collection and in-vehicle entertainment all greatly improve traffic intelligence.

Figure 2:
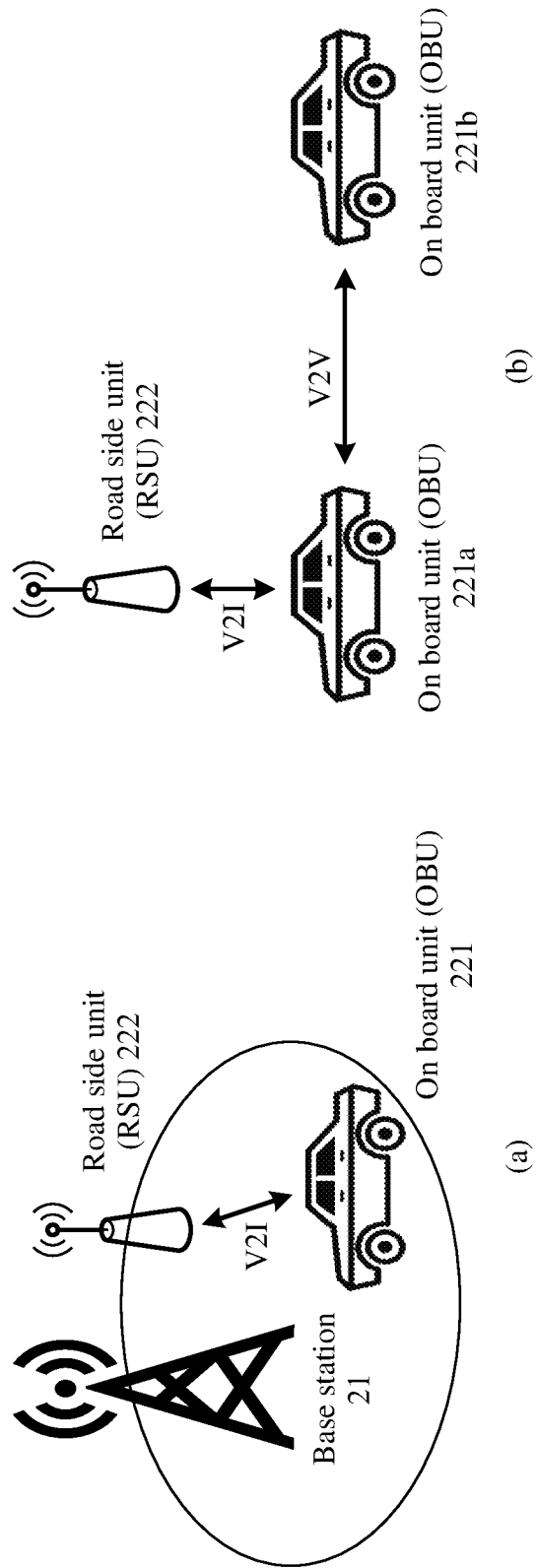
FIG. 2 is a schematic diagram of a V2X deployment scenario according to an embodiment of this application.

Currently, dedicated short-range communications (DSRC) and V2X (C-V2X) communication based on a cellular network are important communication means of the internet of vehicles, for example, V2X communication (LTE-V2X) based on a long term evolution (LTE) communication technology or V2X communication (5G-V2X) based on a 5th generation (5G) communication technology in C-V2X communication. FIG. 2 is a schematic diagram of a V2X deployment scenario according to an embodiment of this application. Refer to FIG. 2. In terms of the deployment scenario, there may be a scenario with network coverage (as shown in (a) in FIG. 2) and a scenario without network coverage (as shown in (b) in FIG. 2). In the scenario with network coverage, a transmission resource in the internet of vehicles may be allocated by a base station 21, and a terminal (for example, an on board unit (OBU) 221 or a road side unit (RSU) 222) may perform data transmission on the transmission resource allocated by the base station 21. In the scenario without network coverage, a terminal (for example, an OBU 221a, an OBU 221b, or an RSU 222) may obtain a configuration of a transmission resource pool by using pre-configured information, then autonomously select a resource from a corresponding transmission resource pool, and perform direct communication between terminals by using the autonomously selected transmission resource.

Figure 3:
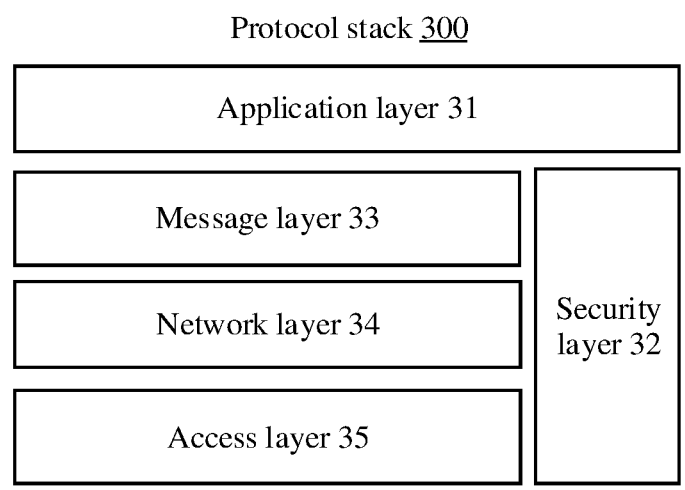
FIG. 3 is a schematic diagram of a V2X end-to-end protocol stack according to an embodiment of this application.

In some possible implementations, FIG. 3 is a schematic diagram of a V2X end-to-end protocol stack according to an embodiment of this application. Refer to FIG. 3. A protocol stack 300 may include an application layer 31, a security layer 32, a message layer 33, a network layer 34, and an access layer 35.

The application layer 31 may provide or define an application used for communication, and provide an interface for an underlying network for information transmission. The application layer 31 may provide, for various applications or services, a protocol followed by an application process during communication, to implement communication and cooperative work between application processes in different devices.

The message layer 33 may provide or define a format and/or content of a message, for example, a format and/or content of a message frame. The message layer 33 may define the format and/or the content of the message in a manner of a message set, and for various services or content, formats and content of message bodies of the various services or content are defined in the message set, to pack or encapsulate information or data from the application layer 31 into a message frame specified in the message set, and deliver the message frame to the network layer 34. The message layer 33 may be used as an independent protocol layer between the application layer 31 and the network layer 34. Alternatively, the message layer 33 may be used as a sublayer of the application layer 31, that is, a function is integrated into the application layer 31. The message layer 33 is connected to the network layer 34 downward, and supports a specific user application upward.

The security layer 32 may provide or define a security mechanism, for example, may define a case in which a security mechanism for data at the message layer includes at least one of the following security processing: signature, signature verification, encryption, decryption, integrity protection, and the like.

The network layer 34 may provide or define a network transmission protocol, to support an access layer transmission technology, so as to provide a data network transmission service. For example, in an implementation, the network layer 34 may include a management sublayer and a data sublayer. The data sublayer mainly defines an adaptation layer, an internet protocol (IP), a user datagram protocol (UDP)/transmission control protocol (TCP), and a dedicated short message protocol (DSMP). The data sublayer may transmit a data stream between application layers, and may also transmit a data stream between management sublayer entities of different devices or between a management sublayer entity and the application layer. The management sublayer mainly completes functions such as system configuration and maintenance. The management sublayer uses a service at the data sublayer to transfer and manage a data stream between different devices. A dedicated management entity (DME) is a universal set of a management service, and the DME provides a management interface for a data sublayer entity, including the DSMP protocol.

The access layer 35 may provide or define a protocol and a transmission mechanism for wireless transmission. For example, when a C-V2X transmission mechanism is used, the access layer may match an access layer protocol of a cellular network. For another example, when a DSRC transmission mechanism is used, the access layer may match a communication protocol used for DSRC.

In this embodiment of this application, different protocol layers in the foregoing protocol stack may be a set of one or more protocol sublayers. For example, the application layer may include one or more service protocols (which may also be understood as application protocols) corresponding to different service types, and the security layer may include an LTE-V2X security protocol or a 5G-V2X security protocol. This is not specifically limited in this embodiment of this application.

With reference to the foregoing protocol stack, a sending end may transfer vehicle information (which may also be referred to as service data) to a message layer at an application layer, transfer the vehicle information to a security layer by default at the message layer, perform security processing on the vehicle information at the security layer, then process vehicle information obtained after the security processing sequentially at the message layer, a network layer, and an access layer, and finally broadcast processed vehicle information of a vehicle with the sending end to a surrounding vehicle, so that, when detecting a possible collision danger, a receiving end notifies a driver in time, to avoid an accident. The vehicle information includes, for example, at least one of the following information: a vehicle speed, a driving direction, a vehicle location, whether an emergency brake is stepped on, and the like.

However, with continuous development of a V2X service, V2X is no longer limited to service data (for example, the foregoing vehicle information) that supports a broadcast service, and also seeks service data that supports a unicast service (for example, sensor data exchange between vehicles or between a vehicle and a road side unit, or communication between a vehicle and a road side unit to perform near-field charging or identity information query and management). For the unicast service, in consideration of confidentiality of end-to-end communication, when sending the service data of the unicast service, the sending end also performs security processing on the data. However, a security mechanism at a V2X security layer is specific to the broadcast service, and is known to different receiving ends. Therefore, if the security mechanism at the V2X security layer is used to perform the security processing on the service data of the unicast service, there may be an information leakage risk, and security is poor.

A near-field payment service is used as an example. The application layer is usually responsible for a security mechanism. However, when LTE-V2X is used to carry the unicast service, for example, near-field payment, the security layer may also be responsible for the security mechanism. It can be learned that, for the V2X unicast service, there may be a plurality of options for a protocol layer responsible for the security mechanism. In addition, different encapsulation formats and interaction procedures are used at different protocol layers when the security processing is performed. If a protocol layer different from the security layer is responsible for the security mechanism, after receiving the service data, the receiving end may perform security processing on the service data by using a security mechanism different from that used by the sending end. As a result, the receiving end cannot perform the security processing, for example, signature verification or decryption, on the service data, the sending end cannot communicate with the receiving end, and reliability is poor.

To resolve the foregoing problems, embodiments of this application provide a communication method. The communication method may be applied to an internet of vehicles communication system, to implement V2X end-to-end secure communication.

Figure 4A:
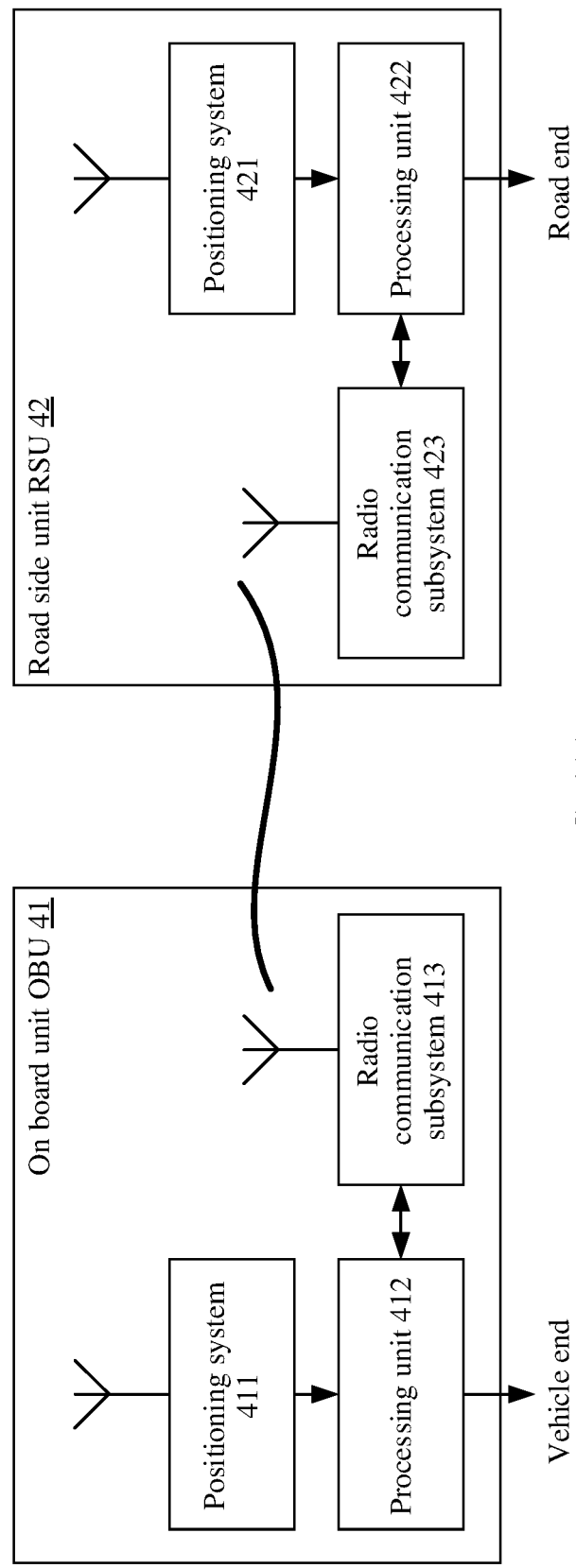
FIG. 4(a) and FIG. 4(b) are a schematic diagram of a V2X communication system according to an embodiment of this application.
Figure 4B:
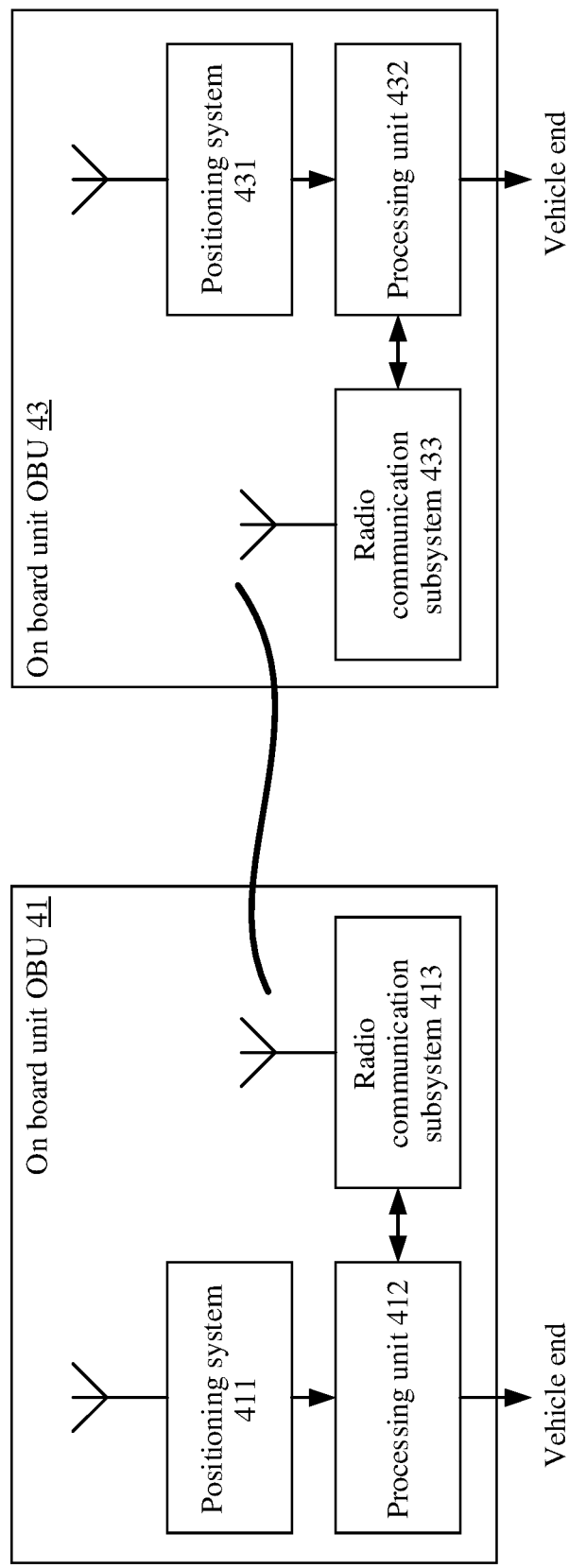

In a possible implementation, FIG. 4(a) and FIG. 4(b) are a schematic diagram of a V2X communication system according to an embodiment of this application. Refer to FIG. 4(a). An internet of vehicles communication system may include an OBU 41 and an RSU 42. The OBU 41 may include a positioning system 411, a processing unit 412, and a radio communication subsystem 413. The RSU 42 may include a positioning system 421, a processing unit 422, and a radio communication subsystem 423. Refer to FIG. 4(b). An internet of vehicles communication system 400 may include an OBU 41 and an OBU 43. The OBU 43 may include a positioning system 431, a processing unit 432, and a radio communication subsystem 433. For the OBU 41, refer to the foregoing descriptions. Details are not described again.

The communication system may include one or more RSUs and one or more OBUs. The OBUs may perform direct communication, the RSUs may perform direct communication, and the OBU and the RSU may perform direct communication. Herein, direct communication means that the RSUs or the OBUs communicate with each other in a radio transmission manner, to implement direct communication and information exchange between vehicles, between a vehicle and an infrastructure, or between a vehicle and a pedestrian. Direct communication may also be referred to as side link or sidelink communication.

In V2X, the OBU may be referred to as an on board unit, or may be referred to as a vehicle-mounted apparatus, a vehicle control unit, or a vehicle control apparatus. The OBU may be located in a vehicle, or may be built in a vehicle and used as a component of the vehicle. In some possible implementations, the OBU may alternatively be a third-party apparatus. This is not specifically limited in this embodiment of this application. The RSU may be referred to as a road side unit, is generally deployed by a road operator, and may transmit traffic light information, traffic control information, road sign information, and the like. This type of information has a high reliability requirement.

The following describes the communication method by using a detailed embodiment.

First, it should be noted that a first device (namely, a sending end device) and a second device (namely, a receiving end device) in the following embodiments may be different types of devices in the internet of vehicles. For example, if the V2X communication system includes an OBU and an RSU, the first device may be the OBU, and the second device may be the RSU, or the first device may be the RSU, and the second device may be the OBU. Alternatively, if the V2X communication system includes an OBU and an OBU, the first device may be the OBU, and the second device may be the OBU.

Figure 5:
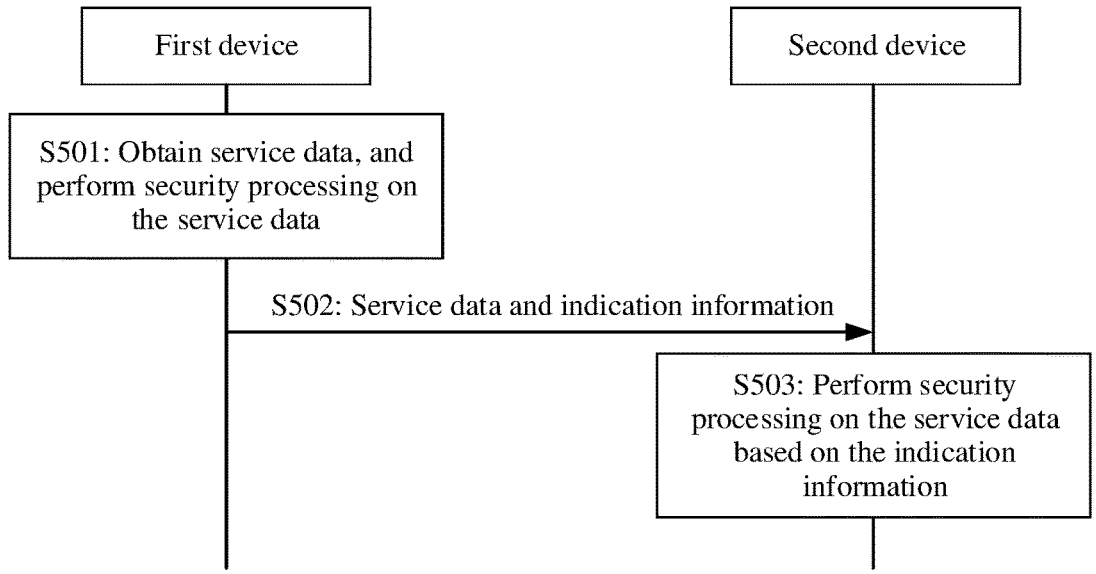
FIG. 5 is a schematic flowchart of a communication method according to an embodiment of this application.

FIG. 5 is a schematic flowchart of a communication method according to an embodiment of this application. Refer to FIG. 5. The communication method may include the following steps.

S501: A first device obtains service data, and performs security processing on the service data.

It may be understood that, when a V2X service needs to send service data to a second device, the first device obtains the service data of the V2X service, and performs security processing on the service data.

Optionally, the V2X service may be a unicast service or a broadcast service. For example, a service type of the V2X service may include but is not limited to near-field payment, electronic toll collection (for example, electronic toll collection (ETC)), vehicle identity management, motor vehicle electronic identifier management, and the like.

In this embodiment of this application, the first device may perform the security processing on the service data by using different security mechanisms.

For example, the first device may perform the security processing on the service data by using a first security mechanism, or may perform the security processing on the service data by using a second security mechanism, or may perform the security processing on the service data by using both a first security mechanism and a second security mechanism.

Alternatively, the first security mechanism may be understood as a general security mechanism, and is applicable to V2X services of different service types; and the second security mechanism may be understood as a dedicated security mechanism, and is applicable to a V2X service of a preset service type, for example, near-field payment, electronic toll collection, vehicle identity management, or motor vehicle electronic identifier management.

Alternatively, the first security mechanism may be understood as a V2X-based security mechanism (for example, an LTE-V2X security mechanism), for example, a security mechanism provided at a security layer in an LTE-V2X protocol stack; and the second security mechanism may be understood as a security mechanism that is set for a service type, for example, a security mechanism provided at an application layer or a message layer in the LTE-V2X protocol stack for a specific service.

Alternatively, the first security mechanism may be understood as a security mechanism used to perform the security processing at a security layer; and the second security mechanism may be understood as a security mechanism used to perform the security processing at an application layer or a message layer.

S502: The first device sends service data (namely, the service data obtained after the security processing) and indication information to the second device.

In an embodiment, the indication information may indicate a security mechanism used to perform the security processing on the service data. For example, the indication information may indicate the first security mechanism, the second security mechanism, or the first security mechanism and the second security mechanism that are used to perform the security processing on the service data.

In some possible implementations, the indication information may further indicate content of the security processing. It may be understood that the content of the security processing may be a specific security processing manner.

During actual application, the security mechanism and the content of the security processing may be indicated by using different information fields in a same message. Certainly, in another implementation, the security mechanism and the content of the security processing may alternatively be indicated by using a plurality of different indication messages.

For example, when the security mechanism indicated by the indication information is the first security mechanism, content of corresponding security processing may include one of mechanisms such as no encryption and no signature, signature only and no encryption, and signature and encryption; or when the security mechanism indicated by the indication information is the second security mechanism, content of corresponding security processing may include a security mode (namely, a first part) and/or a security function (namely, a second part). The security mode is associated with the security function. The security mode indicates a security processing capability for the V2X service, and the security function indicates a security function used in a specific security mode. The security mode and the security function can cooperatively indicate specific security processing performed on the service data.

During actual application, the security mode may include but is not limited to supporting security authentication, supporting no security authentication, supporting security authentication but requiring no encrypted communication, supporting security authentication and requiring encrypted communication, and the like; and the security function may include but is not limited to asymmetric encryption, symmetric encryption, exclusive OR bidirectional authentication, exclusive OR unidirectional authentication, symmetric encryption and unidirectional authentication, and the like. For example, when the security mode is supporting security authentication, the associated security function may be exclusive OR bidirectional authentication, exclusive OR unidirectional authentication, or symmetric encryption and unidirectional authentication; or when the security mode is supporting security authentication and requiring encrypted communication, the associated security function may include one of exclusive OR bidirectional authentication, exclusive OR unidirectional authentication, or symmetric encryption and unidirectional authentication, and one of asymmetric encryption or symmetric encryption.

Figure 6:
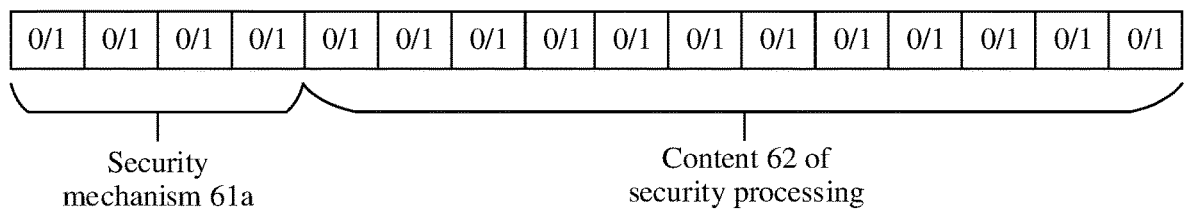
FIG. 6 is a schematic diagram of an indication information according to an embodiment of this application.
Figure 6:
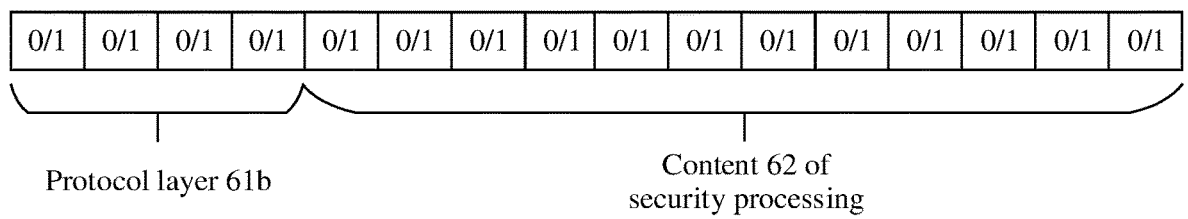

In a specific implementation process, the indication information may be implemented in a form of a bitmap. The indication information may be a character string of N bits. First K bits of the character string indicate the security mechanism used to perform the security processing on the service data, for example, the first security mechanism and/or the second security mechanism. Last (N−K) bits of the character string indicate the content of the security processing, for example, the security mode and/or the security function associated with the security mode. N is a positive integer, and K is a positive integer less than N. For example, FIG. 6 is a schematic diagram of the indication information according to an embodiment of this application. Refer to (a) in FIG. 6. It is assumed that the indication information is a character string of 16 bits. First four bits (that is, K=4) indicate a security mechanism 61a used to perform the security processing on the service data. Last 12 bits indicate content 62 of the security processing.

In another embodiment, the indication information may indicate a protocol layer used to perform the security processing on the service data. For example, the indication information may indicate to perform the security processing on the service data at a security layer, at an application layer, or at a security layer and an application layer. In other words, the first device may perform the security processing on the service data at the security layer (for example, a security layer in a V2X protocol stack); or the first device may perform the security processing on the service data at the application layer (for example, an application layer in a V2X protocol stack); or the first device may perform the security processing on the service data at the application layer and the security layer.

During actual application, the protocol layer and content of the security processing may be indicated by using different information fields in the indication information. Certainly, in another implementation, the protocol layer and the content of the security processing may be indicated by using a plurality of independent messages.

For example, when the protocol layer indicated by the indication information is the security layer, content of corresponding security processing may include one of mechanisms such as no encryption and no signature, signature only and no encryption, and signature and encryption; or when the protocol layer indicated by the indication information is the application layer or a message layer, content of corresponding security processing may include a security mode (namely, a first part) and/or a security function (namely, a second part). The security mode is associated with the security function. The security mode indicates a security processing capability for the V2X service, and the security function indicates a security function used in a specific security mode. The security mode and the security function can cooperatively indicate specific security processing performed on the service data.

During actual application, the security mode may include but is not limited to supporting security authentication, supporting no security authentication, supporting security authentication but requiring no encrypted communication, supporting security authentication and requiring encrypted communication, and the like; and the security function may include but is not limited to asymmetric encryption, symmetric encryption, exclusive OR bidirectional authentication, exclusive OR unidirectional authentication, symmetric encryption and unidirectional authentication, and the like. For example, when the security mode is supporting security authentication, the associated security function may be exclusive OR bidirectional authentication, exclusive OR unidirectional authentication, or symmetric encryption and unidirectional authentication; or when the security mode is supporting security authentication and requiring encrypted communication, the associated security function may include one of exclusive OR bidirectional authentication, exclusive OR unidirectional authentication, or symmetric encryption and unidirectional authentication, and one of asymmetric encryption or symmetric encryption.

In a specific implementation process, the indication information may be implemented in a form of a bitmap. The indication information may be a character string of N bits. First K bits of the character string indicate the protocol layer used to perform the security processing on the service data, for example, the security layer and/or the application layer/message layer. Last (N−K) bits of the character string indicate the content of the security processing, for example, the security mode and/or the security function associated with the security mode. N is a positive integer, and K is a positive integer less than N. For example, refer to (b) in FIG. 6. It is assumed that the indication information is a character string of 16 bits. First four bits (that is, K=4) indicate a protocol layer 61b used to perform the security processing on the service data. Last 12 bits indicate content 62 of the security processing.

The foregoing bit quantity of the indication information is merely an example, and another bit quantity may alternatively be used for indication. For example, first two bits indicate the security mechanism used to perform the security processing on the service data or the protocol layer used to perform the security processing on the service data.

In some possible implementations, the method may further include: The first device sends identification information to the second device. The identification information identifies a service type of the service data.

In addition to sending the service data and the indication information to the second device, the first device may further send the identification information to the second device, to indicate the service type of the service data to the second device. In this case, if the indication information indicates to perform the security processing on the service data at the application layer, the second device may perform, based on the service type indicated by the identification information, the security processing on the service data in a security processing manner corresponding to the service type.

In this embodiment of this application, by using the indication information, the second device can learn of the security mechanism used to perform the security processing on the service data, and then can perform security processing by using the corresponding security mechanism. This reduces an information leakage risk, thereby improving security of V2X end-to-end communication. Further, a case in which the first device and the second device cannot communicate because different security mechanisms are used is reduced, and reliability of V2X end-to-end communication is improved.

S503: The second device performs the security processing on the service data based on the indication information.

It may be understood that, after receiving the service data and the indication information from the first device, the second device may perform the security processing on the service data based on the security mechanism or the protocol layer indicated by the indication information.

In an embodiment, if the security mechanism indicated by the indication information is the first security mechanism, the second device performs the security processing on the service data by using the first security mechanism. Alternatively, if the security mechanism indicated by the indication information is the second security mechanism, the second device performs the security processing on the service data by using the second security mechanism. Alternatively, if the security mechanism indicated by the indication information is the first security mechanism and the second security mechanism, the second device performs the security processing on the service data by using the first security mechanism and the second security mechanism.

Further, the indication information further indicates the content of the security processing. In this case, the second device may perform the security processing on the service data based on the security mechanism and the content of the security processing that are indicated by the indication information. For example, if the security mechanism indicated by the indication information is the first security mechanism and the content of the security processing is first content (for example, encryption and no signature), the second device performs the security processing on the service data by using the first security mechanism and the first content. Alternatively, if the security mechanism indicated by the indication information is the second security mechanism and the content of the security processing is second content (for example, supporting security authentication and using exclusive OR bidirectional authentication), the second device performs the security processing on the service data by using the second security mechanism and the second content.

In another embodiment, if the protocol layer indicated by the indication information is the security layer, the second device performs the security processing on the service data at the security layer. Alternatively, if the protocol layer indicated by the indication information is the application layer or the message layer, the second device performs the security processing on the service data at the application layer or the message layer. Alternatively, if the protocol layer indicated by the indication information is the security layer and the application layer, the second device performs the security processing on the service data at the security layer and the application layer. Alternatively, if the protocol layer indicated by the indication information is the security layer and the message layer, the second device performs the security processing on the service data at the security layer and the message layer.

Further, the indication information further indicates the content of the security processing. In this case, the second device may perform the security processing on the service data based on the protocol layer and the content of the security processing that are indicated by the indication information. For example, if the protocol layer indicated by the indication information is the security layer and the content of the security processing is first content, the second device performs the security processing on the service data at the security layer by using the first content. If the protocol layer indicated by the indication information is the application layer or the message layer and the content of the security processing is second content, the second device performs the security processing on the service data at the application layer or the message layer by using the second content.

In some possible implementations, S502 may be implemented in the following manner: The first device sends a data frame to the second device. The data frame may include a frame header and a payload. The indication information is carried in the frame header, and the service data is carried in the payload.

Figure 7:
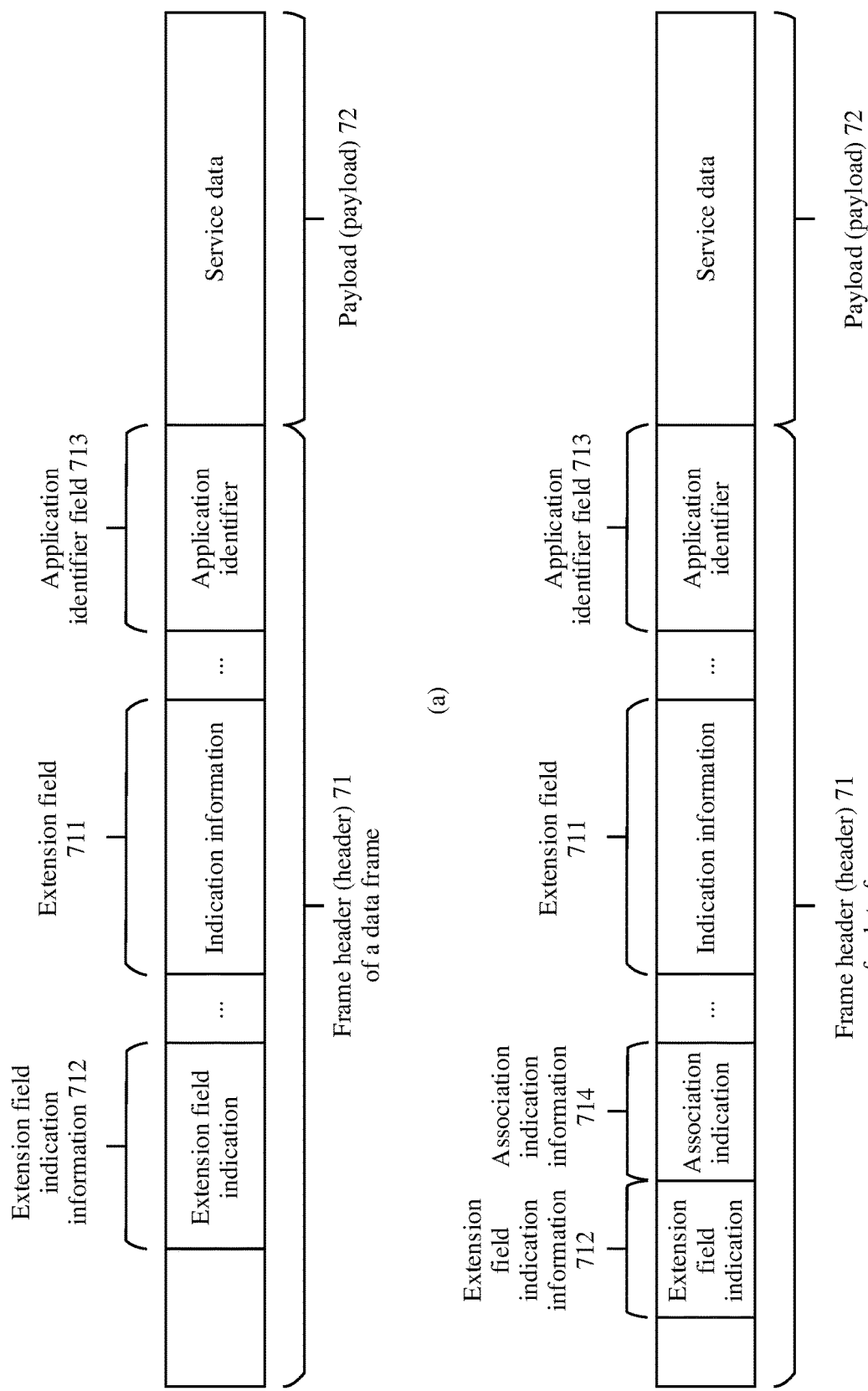
FIG. 7 is a schematic diagram of a data frame according to an embodiment of this application.

For example, FIG. 7 is a schematic diagram of the data frame according to an embodiment of this application. Refer to (a) and (b) in FIG. 7, a structure of the data frame may include a frame header 71 and a payload 72. The indication information may be carried in the frame header 71, and the service data may be carried in the payload 72.

Further, refer to (a) in FIG. 7. The frame header 71 may further include an extension (header extension) field 711 and extension field indication information (header extension indicator) 712. When encapsulating the data frame, the first device may carry the indication information in the extension field 711. In this case, the extension field indication information 712 may be set to a true value (TRUE), to indicate that the extension field of the data frame carries the indication information. In this case, the indication information carried in the extension field 711 is associated, by fault, with the service data carried in the payload 72.

In some possible implementations, the first device may further carry the identification information, namely, an application identifier corresponding to the service data, in the data frame. Refer to (a) and (b) in FIG. 7. The identification information may be carried in an application identifier (AID) field 713 in the frame header 71. Optionally, association indication information 714 may further indicate whether there is an association relationship between the indication information and the identification information. If the association indication information 714 is set to a true value (TRUE), it indicates that the indication information is associated with the identification information. If the association indication information 714 is set to a non-true value (FALSE), it indicates that the indication information has no association relationship with the identification information.

For example, the data frame may be a data frame at a network layer, for example, a dedicated short message (DSM) frame or a dedicated service advertisement frame. This is not specifically limited in this embodiment of this application.

The following describes the foregoing communication method with reference to the foregoing V2X protocol stack by using an example in which indication information indicates a security mechanism used to perform security processing on service data and the indication information is carried in a data frame.

Figure 8:
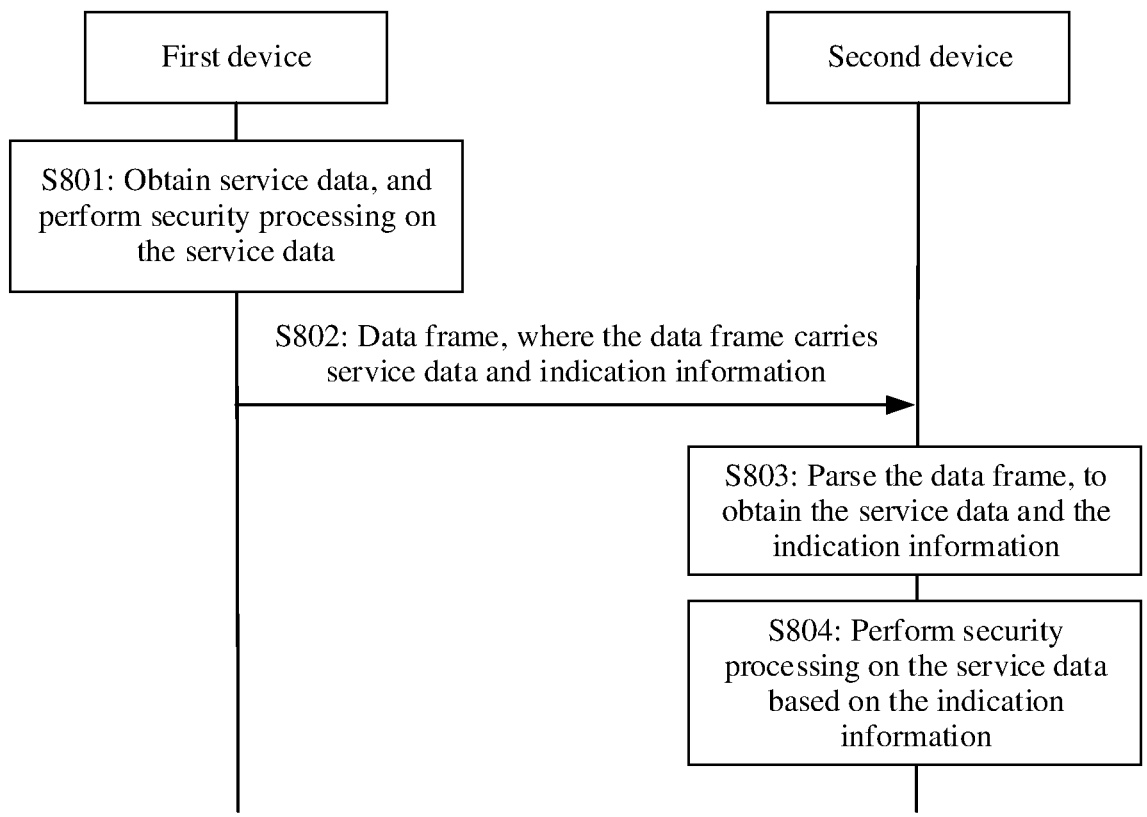
FIG. 8 is a schematic flowchart of another communication method according to an embodiment of this application.

FIG. 8 is a schematic flowchart of another communication method according to an embodiment of this application. Refer to FIG. 8. The communication method may include the following steps.

S801: A first device obtains service data of a V2X service (namely, a first service), and performs security processing on the service data.

S802: The first device sends a data frame to a second device, where the data frame carries service data and indication information corresponding to the service data.

Herein, the indication information indicates a security mechanism used to perform the security processing on the service data.

For example, the indication information may indicate that the security mechanism used to perform the security processing on the service data is an LTE-V2X security mechanism (which may be understood as a security mechanism provided at an LTE-V2X security layer in the foregoing protocol stack). Alternatively, the indication information may indicate that a security mechanism (which may be understood as a security mechanism provided in a service protocol corresponding to near-field payment) corresponding to near-field payment is used for the service data. Alternatively, the indication information may indicate that a security mechanism (which may be understood as a security mechanism provided in a service protocol corresponding to identity management) corresponding to identity management is used for the service data. Different types of V2X services correspond to different service protocols. Therefore, security mechanisms used for service data of these V2X services may be provided in different service protocols.

In some possible implementations, in addition to indicating the security mechanism used for the service data, the indication information may further indicate content of the security processing. It may be understood that the content of the security processing may be specific processing content corresponding to a security mechanism. For example, when the security mechanism used for the service data is the LTE-V2X security mechanism, corresponding processing content may include one of mechanisms such as no encryption and no signature, signature only and no encryption, signature and encryption. When the security mechanism used for the service data is a security mechanism corresponding to the V2X service, corresponding processing content may include a security mode (namely, a first part) and a security function (namely, a second part). The security mode is associated with the security function. The security mode indicates a security processing capability for the V2X service, and the security function indicates a security function used in a specific security mode. The security mode and the security function can cooperatively indicate specific security processing performed on the service data, so that the second device can perform corresponding security processing on the service data, to improve reliability of V2X end-to-end communication.

During actual application, the security mode may include but is not limited to supporting security authentication, supporting no security authentication, supporting security authentication but requiring no encrypted communication, supporting security authentication and requiring encrypted communication, and the like; and the security function may include but is not limited to asymmetric encryption, symmetric encryption, exclusive OR bidirectional authentication, exclusive OR unidirectional authentication, symmetric encryption and unidirectional authentication, and the like. For example, when the security mode is supporting security authentication, the associated security function may be exclusive OR bidirectional authentication, exclusive OR unidirectional authentication, or symmetric encryption and unidirectional authentication; or when the security mode is supporting security authentication and requiring encrypted communication, the associated security function may include one of exclusive OR bidirectional authentication, exclusive OR unidirectional authentication, or symmetric encryption and unidirectional authentication, and one of asymmetric encryption or symmetric encryption.

For example, the indication information may be implemented in a form of a bitmap. The indication information may be a character string of N bits. First K bits of the character string indicate that the security mechanism provided in a protocol layer is used for the service data. Last (N−K) bits of the character string indicate a specific mechanism (namely, content of security processing performed under the security mechanism) used for the service data. N is a positive integer, and K is a positive integer less than N.

For example, still refer to FIG. 6. It is assumed that the indication information is a character string of 16 bits. First four bits (that is, K=4) indicate that the security mechanism provided in the protocol layer is used for the service data. Last 12 bits indicate the specific mechanism (namely, the content of the security processing performed under the security mechanism). In this case, if the indication information indicates that the LTE-V2X security mechanism is used for the service data, the first four bits may be set to 0000. If the indication information indicates that a security mechanism provided at an application layer corresponding to ETC is used for the service data, the first four bits may be set to 0001. If the indication information indicates that a security mechanism provided at an application layer corresponding to identity management is used for the service data, the first four bits may be set to 0010.

Correspondingly, in an implementation, if the first four bits are set to 0000, the last 12 bits in ascending order sequentially indicate no encryption and no signature (a first bit), signature only and no encryption (a second bit), and signature and encryption (a third bit). If a bit is set to 1, it indicates that a specific mechanism corresponding to the bit is used. On the contrary, if a bit is set to 0, it indicates that a specific mechanism corresponding to the bit is not used. It may be understood that, if the last 12 bits of the character string are 000000000001, it indicates that a specific mechanism is no encryption and no signature. If the last 12 bits of the character string are 000000000010, it indicates that a specific mechanism is signature only and no encryption. If the last 12 bits of the character string are 000000000100, it indicates that a specific mechanism is signature and encryption.

Alternatively, if the first four bits are set to 0010, in the last 12 bits, an eleventh bit and a twelfth bit indicate the security mode. Herein, 00 indicate supporting no security authentication, 01 indicate supporting security authentication, 10 indicate supporting security authentication but requiring no encrypted communication, and 11 indicate supporting security authentication and requiring encrypted communication. A first bit to a seventh bit indicate the security function. The first bit indicates that an OBU supports exclusive OR unidirectional authentication for an RSU. A second bit indicates that the OBU supports symmetric encryption and unidirectional authentication for the RSU. A third bit indicates that the RSU supports exclusive OR unidirectional authentication for the OBU. A fourth bit indicates that the RSU supports symmetric encryption and unidirectional authentication for the OBU. A fifth bit indicates exclusive OR bidirectional authentication. A sixth bit indicates symmetric encryption. The seventh bit indicates encrypted communication. Similarly, if a bit in the first bit to the seventh bit is set to 1, it indicates that a specific security function corresponding to the bit is used. On the contrary, if a bit in the first bit to the seventh bit is set to 0, it indicates that a specific security function corresponding to the bit is not used.

Certainly, an implementation of the indication information is not limited to the foregoing example. A person skilled in the art may set the indication information based on a requirement of the person skilled in the art. This is not specifically limited in this embodiment of this application.

In some possible implementations, before S802, the first device obtains the service data (the service data has undergone the security processing) and the corresponding indication information at a message layer. Then, the first device transfers the service data and the corresponding indication information to a network layer at the message layer. Finally, the first device encapsulates the service data and the corresponding indication information into the data frame at the network layer, and sends the data frame to the second device by using an access layer. After receiving the data frame, the second device may determine, based on the indication information in the data frame, the security mechanism used for the service data, and then can perform the corresponding security processing on the service data, to improve reliability of V2X end-to-end communication.

In a specific implementation process, the first device may transfer the service data to the message layer after performing the security processing on the service data at an application layer. Then, the first device may determine, at the message layer based on an encapsulation format of the service data, a security mechanism used to perform the security processing on the service data, and then determine the indication information corresponding to the service data. Alternatively, the first device may transfer the corresponding indication information when transferring the service data to the message layer at an application layer, and then obtain the service data and the corresponding indication information at the message layer.

In some possible implementations, before S802, the first device may further obtain, at the message layer, an application identifier corresponding to the service data. The application identifier indicates a service type corresponding to the service data. Similar to that in the foregoing manner of obtaining the indication information, the application identifier may be transferred by the first device to the message layer at the application layer, or may be determined by the first device at the message layer based on the encapsulation format of the service data. The first device may further transfer the application identifier when transferring the service data and the indication information to the network layer at the message layer. In this case, the first device may encapsulate the service data, the indication information corresponding to the service data, and the application identifier into the data frame at the network layer, and then send the data frame to the second device by using the access layer.

Next, after S802, S803 is performed. To be specific, the second device parses the data frame, to obtain the service data and the indication information.

It may be understood that the second device receives the data frame from the network layer of the first device at a network layer, and then decapsulates the data frame at the network layer, to extract the service data and the indication information from the data frame. Then, the second device transfers the service data and the indication information to a message layer at the network layer.

In some possible implementations, if the data frame further carries the application identifier corresponding to the service data, the second device may further extract the application identifier when decapsulating the data frame at the network layer. Then, the second device may further transfer, to the message layer at the network layer, the application identifier corresponding to the service data, to indicate the service type corresponding to the service data.

S804: The second device performs the security processing on the service data based on the security mechanism indicated by the indication information.

It may be understood that the second device receives, at the message layer, the service data and the indication information that are transferred at the network layer. Then, the second device determines, at the message layer based on the indication of the indication information, the security mechanism used for the service data. Finally, the second device performs the security processing on the service data at the message layer based on the security mechanism indicated by the indication information.

For example, when the indication information indicates that an LTE-V2X security mechanism A is used for the service data, the second device transfers the service data to a security layer at the message layer, and performs the security processing on the service data at the security layer based on the security mechanism A. Alternatively, when the indication information indicates that a security mechanism B corresponding to near-field payment is used for the service data, the second device performs the security processing on the service data at the message layer based on the security mechanism B. In addition, when the indication information indicates that a security mechanism C corresponding to identity management is used for the service data, the second device performs the security processing on the service data at the message layer based on the security mechanism C.

It should be noted that, if an application layer supports the security mechanism corresponding to the V2X service, the second device may transfer the service data to the application layer at the message layer, so that the second device performs the security processing on the service data at the application layer by using the security mechanism corresponding to the V2X service. If the message layer supports the security mechanism corresponding to the V2X service, the second device may perform the security processing on the service data at the message layer by using the security mechanism corresponding to the V2X service.

In another possible implementation, if the indication information indicates that a V2X security mechanism A and a security mechanism C corresponding to an identity management service are used for the service data, the second device may transfer the service data to a security layer at the message layer, so that security processing is first performed on the service data at the security layer based on the security mechanism A. Then, the second device may transfer processed service data to the message layer at the security layer, and the second device may perform, at the message layer based on the security mechanism C, security processing again on the service data obtained after being processed at the security layer.

In this way, the first device and the second device implement V2X end-to-end secure communication.

The following describes the foregoing communication method by using a specific example.

It is assumed that the first device sends service data of a service D to the second device. In this case, the foregoing communication method may include the following steps.

Step 1: The first device transfers the service data of the service D and corresponding indication information to the message layer at the application layer. The indication information indicates that a security mechanism d provided by the service D at the application layer is used for the service data.

Step 2: The first device transfers the service data and the corresponding indication information to the network layer at the message layer.

Step 3: The first device encapsulates the service data and the corresponding indication information into a data frame at the network layer.

Step 4: The first device sends the data frame to the second device at the network layer.

Step 5: The second device extracts the service data and the corresponding indication information from the data frame at the network layer.

Step 6: The second device transfers the service data and the corresponding indication information to the message layer at the network layer.

Step 7: The second device transfers the service data and the corresponding indication information to the application layer at the message layer based on the indication of the indication information.

Step 8: The second device performs security processing on the service data of the service D at the application layer by using the security mechanism d.

It can be learned from the foregoing descriptions that, in this embodiment of this application, the first device indicates, to the second device, the security mechanism or the protocol layer used to perform the security processing on the service data, so that the second device can perform, based on the indication of the first indication information, the security processing on the service data by using the corresponding security mechanism. This reduces an information leakage risk, thereby improving security of V2X end-to-end communication. Further, the first device indicates, to the second device, the security mechanism or the protocol layer used to perform the security processing on the service data, so that the second device can perform, based on the indication of the first indication information, the security processing on the service data by using the corresponding security mechanism. This reduces a case in which the first device and the second device cannot communicate because different security mechanisms are used, thereby improving reliability of V2X end-to-end communication.

Figure 9:
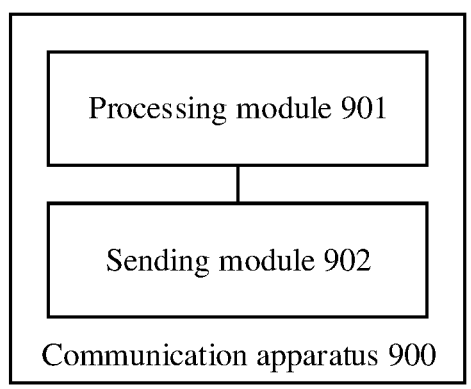
FIG. 9 is a schematic diagram of a structure of a communication apparatus according to an embodiment of this application.

Based on a same inventive concept, an embodiment of this application further provides a communication apparatus. The communication apparatus may be a first device in the internet of vehicles or a chip or a system-on-a-chip in a first device, or may be a function module that is configured to implement the method according to any one of the first aspect and the possible implementations of the first aspect and that is in a first device. The communication apparatus may implement a function performed by the first device in the foregoing aspects or the possible implementations. The function may be implemented by hardware executing corresponding software. The hardware or the software includes one or more modules corresponding to the foregoing function. FIG. 9 is a schematic diagram of a structure of a communication apparatus according to an embodiment of this application. Refer to FIG. 9. A communication apparatus 900 includes: a processing module 901, configured to: obtain service data, and perform security processing on the service data; and a sending module 902, configured to send service data and indication information to a second device. The indication information indicates a security mechanism used to perform the security processing on the service data or indicates a protocol layer used to perform the security processing on the service data.

In some possible implementations, the sending module is further configured to send identification information to the second device. The identification information identifies a service type of the service data.

In some possible implementations, the indication information further indicates content of the security processing.

In some possible implementations, the indication information is a character string of N bits. First K bits of the character string indicate the security mechanism used to perform the security processing on the service data. Last (N−K) bits of the character string indicate the content of the security processing. N is a positive integer, and K is a positive integer less than N.

In some possible implementations, the indication information indicates a first security mechanism used for the security processing, or indicates a second security mechanism used for the security processing, or indicates a first security mechanism and a second security mechanism that are used for the security processing. Alternatively, the indication information indicates to perform the security processing on the service data at an application layer, at a security layer, or at an application layer and a security layer.

In some possible implementations, the first security mechanism is a V2X-based security mechanism, and the second security mechanism is a security mechanism that is set for a service type.

In some possible implementations, when the security mechanism used for the security processing is the first security mechanism, content of the security processing includes no encryption and no signature, signature only and no encryption, or signature and encryption.

In some possible implementations, when the security mechanism used for the security processing is the second security mechanism, content of the security processing includes a first part and a second part associated with the first part. The first part includes supporting security authentication, supporting no security authentication, supporting security authentication but requiring no encrypted communication, or supporting security authentication and requiring encrypted communication. The second part includes asymmetric encryption, symmetric encryption, exclusive OR bidirectional authentication, exclusive OR unidirectional authentication, or symmetric encryption and unidirectional authentication.

In some possible implementations, the sending module is specifically configured to send a data frame to the second device. The data frame includes a frame header and a payload. The indication information is carried in the frame header, and the service data is carried in the payload.

In some possible implementations, the frame header includes an extension field and extension field indication information. When the indication information is carried in the extension field, the extension field indication information indicates that the data frame carries the indication information.

In some possible implementations, the frame header further includes association indication information. The association indication information indicates whether the indication information is associated with the service data in the payload. When the association indication information is set to a true value, the association indication information indicates that the indication information is associated with the service data in the payload. When the association indication information is set to a non-true value, the association indication information indicates that the indication information is not associated with the service data in the payload.

In some possible implementations, the processing module 901 is further configured to: before the sending module 902 sends the data frame to the second device, transfer the service data and the indication information to a network layer at a message layer; and encapsulate the service data and the indication information into the data frame at the network layer.

It should be noted that, for specific implementation processes of the processing module 901 and the sending module 902, refer to detailed descriptions of embodiments in FIG. 5 to FIG. 8. For brevity of this specification, details are not described herein again.

The sending module 902 mentioned in this embodiment of this application may be a sending interface, a sending circuit, a sender, or the like. The processing module 901 may be one or more processors.

Figure 10:
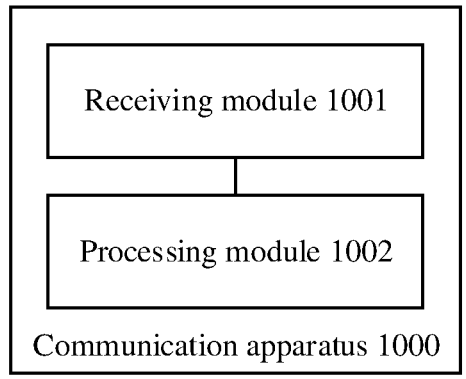
FIG. 10 is a schematic diagram of a structure of another communication apparatus according to an embodiment of this application.

Based on a same inventive concept, an embodiment of this application further provides a communication apparatus. The communication apparatus may be a second device in the internet of vehicles or a chip or a system-on-a-chip in a second device, or may be a function module that is configured to implement the method according to any one of the second aspect and the possible implementations of the second aspect and that is in a second device. The communication apparatus may implement a function performed by the second device in the foregoing aspects or the possible implementations. The function may be implemented by hardware executing corresponding software. The hardware or the software includes one or more modules corresponding to the foregoing function. FIG. 10 is a schematic diagram of a structure of another communication apparatus according to an embodiment of this application. Refer to FIG. 10. A communication apparatus 1000 includes: a receiving module 1001, configured to receive service data and indication information from a first device; and a processing module 1002, configured to perform security processing on the service data based on the indication information. The indication information indicates a security mechanism used to perform the security processing on the service data or indicates a protocol layer used to perform the security processing on the service data.

In some possible implementations, the receiving module 1001 is further configured to receive identification information from the first device. The identification information identifies a service type of the service data.

In some possible implementations, the indication information further indicates content of the security processing.

In some possible implementations, the indication information is a character string of N bits. First K bits of the character string indicate the security mechanism used to perform the security processing on the service data. Last (N−K) bits of the character string indicate the content of the security processing. N is a positive integer, and K is a positive integer less than N.

In some possible implementations, the indication information indicates a first security mechanism used for the security processing, or indicates a second security mechanism used for the security processing, or indicates a first security mechanism and a second security mechanism that are used for the security processing. Alternatively, the indication information indicates to perform the security processing on the service data at an application layer, at a security layer, or at an application layer and a security layer.

In some possible implementations, the first security mechanism is a V2X-based security mechanism, and the second security mechanism is a security mechanism that is set for a service type.

In some possible implementations, when the security mechanism used for the security processing is the first security mechanism, content of the security processing includes no encryption and no signature, signature only and no encryption, or signature and encryption.

In some possible implementations, when the security mechanism used for the security processing is the second security mechanism, content of the security processing includes a first part and a second part associated with the first part. The first part includes supporting security authentication, supporting no security authentication, supporting security authentication but requiring no secure communication, or supporting security authentication and requiring secure communication. The second part includes asymmetric encryption, symmetric encryption, exclusive OR bidirectional authentication, exclusive OR unidirectional authentication, or symmetric encryption and unidirectional authentication.

In some possible implementations, the receiving module 1001 is specifically configured to receive a data frame from the first device. The data frame includes a frame header and a payload. The indication information is carried in the frame header, and the service data is carried in the payload.

In some possible implementations, the frame header includes an extension field and extension field indication information. When the indication information is carried in the extension field, the extension field indication information indicates that the data frame carries the indication information.

In some possible implementations, the frame header further includes association indication information. The association indication information indicates whether the indication information is associated with the service data in the payload. When the association indication information is set to a true value, the association indication information indicates that the indication information is associated with the service data in the payload. When the association indication information is set to a non-true value, the association indication information indicates that the indication information is not associated with the service data in the payload.

In some possible implementations, the processing module 1002 is further configured to: after the receiving module receives the data frame from the first device, obtain the service data and the indication information in the data frame at a network layer; transfer the service data and the indication information to a message layer at the network layer; and perform the security processing on the service data at the message layer based on the indication information.

In some possible implementations, the processing module 1002 is specifically configured to: if the protocol layer indicated by the indication information is a security layer, transfer the service data to the security layer at the message layer, and perform the security processing on the service data at the security layer; or if the protocol layer indicated by the indication information is an application layer or the message layer, perform the security processing on the service data at the application layer or the message layer.

In some possible implementations, the processing module 1002 is specifically configured to: if the protocol layer indicated by the indication information is a security layer and an application layer, transfer the service data to the security layer at the message layer; perform the security processing on the service data at the security layer; transfer processed service data to the message layer at the security layer; and perform the security processing on the processed service data at the message layer.

It should be noted that, for specific implementation processes of the receiving module 1001 and the processing module 1002, refer to detailed descriptions of embodiments in FIG. 5 to FIG. 8. For brevity of this specification, details are not described herein again.

The receiving module 1001 mentioned in this embodiment of this application may be a receiving interface, a receiving circuit, a receiver, or the like. The processing module 1002 may be one or more processors.

Figure 11:
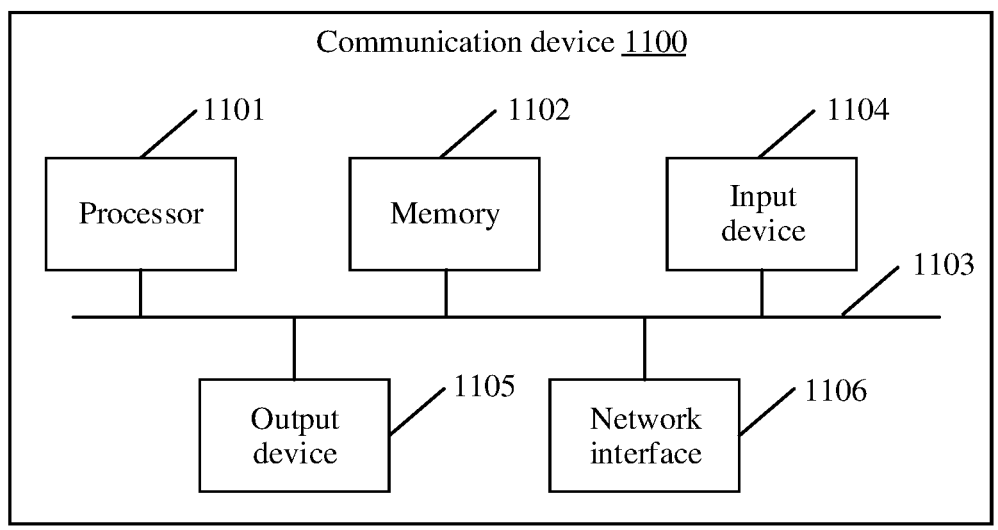
FIG. 11 is a schematic diagram of a structure of a communication device according to an embodiment of this application.

Based on a same inventive concept, an embodiment of this application provides a communication device. The communication device may be the first device or the second device in the foregoing one or more embodiments. FIG. 11 is a schematic diagram of a structure of a communication device according to an embodiment of this application. Refer to FIG. 11. A communication device 1100 uses general-purpose computer hardware, including a processor 1101, a memory 1102, a bus 1103, an input device 1104, and an output device 1105.

In some possible implementations, the memory 1102 may include a computer storage medium in a form of a volatile memory and/or a non-volatile memory, for example, a read-only memory and/or a random access memory. The memory 1102 may store an operating system, an application program, another program module, executable code, program data, user data, and the like.

The input device 1104 may be configured to input a command and information to the communication device. The input device 1104 is a keyboard or a pointing device, for example, a mouse, a trackball, a touchpad, a microphone, a joystick, a game pad, a satellite television antenna, a scanner, or a similar device. These input devices may be connected to the processor 1101 through the bus 1103.

The output device 1105 may be used by the communication device to output information. In addition to a monitor, the output device 1105 may alternatively be another peripheral output device, for example, a speaker and/or a printing device. These output devices may also be connected to the processor 1101 through the bus 1103.

The communication device may be connected to a network through a network interface 1106, for example, connected to a local area network (LAN). In a network connection environment, computer-executable instructions stored in the memory may be stored in a remote storage device, and are not limited to being stored locally.

When the processor 1101 in the communication device executes the executable code or the application program stored in the memory 1102, the communication device performs the communication method on a first device side or a second device side in the foregoing embodiments. For a specific execution process, refer to the foregoing embodiments. Details are not described herein again.

In addition, the memory 1102 stores computer-executable instructions used to implement functions of the processing module 901 and the sending module 902 in FIG. 9. Both functions/implementation processes of the processing module 901 and the sending module 902 in FIG. 9 may be implemented by the processor 1101 in FIG. 11 by invoking the computer-executable instructions stored in the memory 1102. For a specific implementation process and function, refer to the foregoing related embodiments.

Alternatively, the memory 1102 stores computer-executable instructions used to implement functions of the receiving module 1001 and the processing module 1002 in FIG. 10. Both functions/implementation processes of the receiving module 1001 and the processing module 1002 in FIG. 10 may be implemented by the processor 1101 in FIG. 11 by invoking the computer-executable instructions stored in the memory 1102. For a specific implementation process and function, refer to the foregoing related embodiments.

Based on a same inventive concept, an embodiment of this application further provides a computer-readable storage medium. The computer-readable storage medium stores instructions. When being run on a computer, the instructions are used to perform the communication method on a first device side or a second device side in the foregoing one or more embodiments.

Based on a same inventive concept, an embodiment of this application further provides a computer program or a computer program product. When the computer program product is executed on a computer, the computer is enabled to implement the communication method on a first device side or a second device side in the foregoing one or more embodiments.

A person skilled in the art can appreciate that functions described with reference to various illustrative logical blocks, modules, and algorithm steps disclosed and described in this specification may be implemented by hardware, software, firmware, or any combination thereof. If the functions are implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium, for example, a data storage medium, or a communication medium including any medium that facilitates transfer of a computer program from one place to another place (for example, according to a communication protocol). In this manner, the computer-readable medium may generally correspond to (1) a non-transitory tangible computer-readable storage medium or (2) a communication medium, for example, a signal or a carrier. The data storage medium may be any usable medium that can be accessed by one or more computers or one or more processors to retrieve instructions, code, and/or data structures for implementing the technologies described in this application. The computer program product may include a computer-readable medium.

By way of example and not limitation, such computer-readable storage media may include a RAM, a ROM, an EEPROM, a CD-ROM or another optical disc storage apparatus, a magnetic disk storage apparatus or another magnetic storage apparatus, a flash memory, or any other medium that can store related program code in a form of instructions or data structures and that can be accessed by a computer. In addition, any connection is appropriately referred to as a computer-readable medium. For example, if an instruction is transmitted from a website, a server, or another remote source through a coaxial cable, an optical fiber, a twisted pair, a digital subscriber line (DSL), or a wireless technology, for example, infrared, radio, or microwave, the coaxial cable, the optical fiber, the twisted pair, the DSL, or the wireless technology, for example, infrared, radio, or microwave, is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the above should also be included within the scope of the computer-readable medium.

An instruction may be executed by one or more processors such as one or more digital signal processors (DSPs), a general microprocessor, an application-specific integrated circuit (ASIC), a field programmable gate array (FPGA), or another equivalent integrated circuit or discrete logic circuits. Therefore, the term "processor" used in this specification may refer to the foregoing structure, or any other structure that may be applied to implementation of the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of apparatuses configured to perform the disclosed technologies, but are not necessarily implemented by using different hardware units. Actually, as described above, various units may be combined into a codec hardware unit in combination with appropriate software and/or firmware, or may be provided by interoperable hardware units (including the one or more processors described above).

In the foregoing embodiments, the descriptions of each embodiment have respective focuses. For a part that is not described in detail in an embodiment, refer to related descriptions in other embodiments.

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising at least one processor and at least one memory, wherein the at least one memory stores program instructions for execution by the at least one processor to:
   obtain first service data;
   perform security processing on the first service data to obtain second service data; and
   send the second service data and indication information to a second device, wherein the indication information indicates a security mechanism used to perform the security processing on the first service data or indicates a protocol layer used to perform the security processing on the first service data,
   wherein the indication information indicates a first security mechanism used for the security processing, or indicates a second security mechanism used for the security processing, or indicates a first security mechanism and a second security mechanism that are used for the security processing,
   or the indication information indicates to perform the security processing on the first service data at an application layer, at a security layer, or at an application layer and a security layer,
   wherein when the security mechanism used for the security processing is the first security mechanism, content of the security processing comprises no encryption and no signature, signature only and no encryption, or signature and encryption.

2. The apparatus according to claim 1, wherein the program instructions are for execution by the at least one processor to:
   send identification information to the second device, wherein the identification information identifies a service type of the second service data.

3. The apparatus according to claim 1, wherein the program instructions are for execution by the at least one processor to:
   send identification information to the second device, wherein the identification information is an application identifier.

4. The apparatus according to claim 1, wherein the indication information further indicates content of the security processing.

5. The apparatus according to claim 4, wherein the indication information is a character string of N bits, wherein first K bits of the character string indicate the security mechanism used for the security processing, last (N−K) bits of the character string indicate the content of the security processing, N is a positive integer, and K is a positive integer less than N.

6. The apparatus according to claim 1, wherein the first security mechanism is a V2X-based security mechanism, and the second security mechanism is a security mechanism that is set for a service type.

7. The apparatus according to claim 1, wherein when the security mechanism used for the security processing is the second security mechanism, content of the security processing comprises a first part and a second part associated with the first part, wherein:
   the first part comprises supporting security authentication, supporting no security authentication, supporting security authentication but requiring no encrypted communication, or supporting security authentication and requiring encrypted communication; and the second part comprises asymmetric encryption, symmetric encryption, exclusive OR bidirectional authentication, exclusive OR unidirectional authentication, or symmetric encryption and unidirectional authentication.

8. The apparatus according to claim 1, wherein the program instructions are for execution by the at least one processor to:
   send a data frame to the second device, wherein the data frame comprises a frame header and a payload, the indication information is carried in the frame header, and the second service data is carried in the payload.

9. The apparatus according to claim 8, wherein the frame header comprises an extension field and extension field indication information; and when the indication information is carried in the extension field, the extension field indication information indicates that the data frame carries the indication information.

10. The apparatus according to claim 8, wherein the frame header further comprises association indication information, and the association indication information indicates whether the indication information is associated with the second service data in the payload.

11. A apparatus, comprising at least one processor and at least one memory, wherein the at least one memory stores program instructions for execution by, and the at least one processor to: receive service data and indication information from a first device; and perform security processing on the service data based on the indication information, wherein:

the indication information indicates a security mechanism used to perform the security processing on the service data or indicates a protocol layer used to perform the security processing on the service data, wherein the indication information indicates a first security mechanism used for the security processing, or indicates a second security mechanism used for the security processing, or indicates a first security mechanism and a second security mechanism that are used for the security processing;

or the indication information indicates to perform the security processing on the service data at an application layer, at a security layer, or at an application layer and a security layer, wherein when the security mechanism used for the security processing is the first security mechanism, content of the security processing comprises no encryption and no signature, signature only and no encryption, or signature and encryption.

12. The apparatus according to claim 11, wherein the program instructions are for execution by the at least one processor to:
receive identification information from the first device, wherein the identification information identifies a service type of the service data.

13. The apparatus according to claim 11, wherein the program instructions are for execution by the at least one processor to:
receive identification information from the first device, wherein the identification information is an application identifier.

14. The apparatus according to claim 11, wherein the indication information further indicates content of the security processing.

15. The apparatus according to claim 11, wherein the first security mechanism is a V2X-based security mechanism, and the second security mechanism is a security mechanism that is set for a service type.

16. The apparatus according to claim 11, wherein when the security mechanism used for the security processing is the second security mechanism, content of the security processing comprises a first part and a second part associated with the first part, wherein:
the first part comprises supporting security authentication, supporting no security authentication, supporting security authentication but requiring no encrypted communication, or supporting security authentication and requiring encrypted communication; and the second part comprises asymmetric encryption, symmetric encryption, exclusive OR bidirectional authentication, exclusive OR unidirectional authentication, or symmetric encryption and unidirectional authentication.

17. The apparatus according to claim 11, wherein the program instructions are for execution by the at least one processor to: receive a data frame from the first device, wherein the data frame comprises a frame header and a payload, the indication information is carried in the frame header, and the service data is carried in the payload.

18. The apparatus according to claim 17, wherein the frame header comprises an extension field and extension field indication information; and when the indication information is carried in the extension field, the extension field indication information indicates that the data frame carries the indication information.

19. The apparatus according to claim 17, wherein the frame header further comprises association indication information, and the association indication information indicates whether the indication information is associated with the service data in the payload.

20. A method, comprising:
obtaining, by a first device, first service data;
performing security processing on the first service data to obtain second service data;
and sending, by the first device, the second service data and indication information to a second device, wherein the indication information indicates a security mechanism used to perform the security processing on the first service data or indicates a protocol layer used to perform the security processing on the first service data, wherein the indication information indicates a first security mechanism used for the security processing, or indicates a second security mechanism used for the security processing, or indicates a first security mechanism and a second security mechanism that are used for the security processing;

or the indication information indicates to perform the security processing on the first service data at an application layer, at a security layer, or at an application layer and a security layer, wherein when the security mechanism used for the security processing is the first security mechanism, content of the security processing comprises no encryption and no signature, signature only and no encryption, or signature and encryption.

21. The method according to claim 20, wherein the method further comprises:
sending, by the first device, identification information to the second device, wherein the identification information identifies a service type of the second service data.

22. The method according to claim 20, wherein the method further comprises:
sending, by the first device, identification information to the second device, wherein the identification information is an application identifier.

23. The method according to claim 20, wherein the indication information further indicates content of the security processing.

24. The method according to claim 20, wherein the first security mechanism is a V2X-based security mechanism, and the second security mechanism is a security mechanism that is set for a service type.

25. The method according to claim 20, wherein when the security mechanism used for the security processing is the second security mechanism, content of the security processing comprises a first part and a second part associated with the first part, wherein:
the first part comprises supporting security authentication, supporting no security authentication, supporting security authentication but requiring no encrypted communication, or supporting security authentication and requiring encrypted communication; and the second part comprises asymmetric encryption, symmetric encryption, exclusive OR bidirectional authentication, exclusive OR unidirectional authentication, or symmetric encryption and unidirectional authentication.

26. The method according to claim 20, wherein the sending, by the first device, the second service data and indication information to a second device comprises: sending, by the first device, a data frame to the second device, wherein the data frame comprises a frame header and a payload, the indication information is carried in the frame header, and the second service data is carried in the payload.

27. A method, comprising:
receiving, by a second device, service data and indication information from a first device; and performing, by the second device, security processing on the service data based on the indication information, wherein:
the indication information indicates a security mechanism used to perform the security processing on the service data or indicates a protocol layer used to perform the security processing on the service data,
wherein the indication information indicates a first security mechanism used for the security processing, or indicates a second security mechanism used for the security processing, or indicates a first security mechanism and a second security mechanism that are used for the security processing; or the indication information indicates to perform the security processing on the service data at an application layer, at a security layer, or at an application layer and a security layer,
wherein when the security mechanism used for the security processing is the first security mechanism, content of the security processing comprises no encryption and no signature, signature only and no encryption, or signature and encryption.

28. The method according to claim 27, wherein the method further comprises:
receiving, by the second device, identification information from the first device, wherein the identification information identifies a service type of the service data.

29. The method according to claim 27, wherein the method further comprises:
receiving, by the second device, identification information from the first device, wherein the identification information is an application identifier.

30. The method according to claim 27, wherein the first security mechanism is a V2X-based security mechanism, and the second security mechanism is a security mechanism that is set for a service type.

31. The method according to claim 27, wherein when the security mechanism used for the security processing is the second security mechanism, content of the security processing comprises a first part and a second part associated with the first part, wherein:
the first part comprises supporting security authentication, supporting no security authentication, supporting security authentication but requiring no encrypted communication, or supporting security authentication and requiring encrypted communication; and the second part comprises asymmetric encryption, symmetric encryption, exclusive OR bidirectional authentication, exclusive OR unidirectional authentication, or symmetric encryption and unidirectional authentication.

32. The method according to claim 27, wherein the receiving, by a second device, service data and indication information from a first device comprises:
receiving, by the second device, a data frame from the first device, wherein the data frame comprises a frame header and a payload, the indication information is carried in the frame header, and the service data is carried in the payload.

* * * * *